(12) United States Patent
O'Boyle et al.

(10) Patent No.: US 12,072,096 B2
(45) Date of Patent: Aug. 27, 2024

(54) METHOD AND SYSTEM FOR IMPROVING BOILER EFFECTIVENESS

(71) Applicant: Arvos Ljungstrom LLC, Wellsville, NY (US)

(72) Inventors: Kevin O'Boyle, Alma, NY (US); Glenn D. Mattison, Machias, NY (US); David G. Breckinridge, Chattanooga, TN (US); Set Erik Jonas Klingspor, Austin, TX (US)

(73) Assignee: Arvos Ljungstrom LLC, Wellsville, NY (US)

( * ) Notice: Subject to any disclaimer, the term of this patent is extended or adjusted under 35 U.S.C. 154(b) by 1024 days.

(21) Appl. No.: 16/316,170

(22) PCT Filed: Jul. 10, 2017

(86) PCT No.: PCT/US2017/041332
§ 371 (c)(1),
(2) Date: Jan. 8, 2019

(87) PCT Pub. No.: WO2018/009926
PCT Pub. Date: Jan. 11, 2018

(65) Prior Publication Data
US 2021/0285637 A1    Sep. 16, 2021

Related U.S. Application Data

(63) Continuation of application No. PCT/US2017/041078, filed on Jul. 7, 2017, which is
(Continued)

(51) Int. Cl.
*F23J 15/02* (2006.01)
*B01D 53/30* (2006.01)
(Continued)

(52) U.S. Cl.
CPC .............. *F23J 15/022* (2013.01); *B01D 53/30* (2013.01); *B01D 53/50* (2013.01); *B01D 53/502* (2013.01);
(Continued)

(58) Field of Classification Search
CPC ...... B01D 53/30; B01D 53/50; B01D 53/502; F27B 37/00; F27B 37/008; F27B 37/02;
(Continued)

(56) References Cited

U.S. PATENT DOCUMENTS 4,455,835 A * 6/1984 Durrant ................ F01K 3/00
60/659
6,089,023 A 7/2000 Anderson et al.
(Continued)

FOREIGN PATENT DOCUMENTS

CN        102278768 B  * 12/2013
DE         2753902 B1     3/1979
(Continued)

OTHER PUBLICATIONS

English Tranlation of JP 2002162020 A (wherein JP 2002162020 A was published Jun. 2002).*
(Continued)

*Primary Examiner* — Steven B McAllister
*Assistant Examiner* — Benjamin W Johnson
(74) *Attorney, Agent, or Firm* — Robinson & Cole LLP

(57) ABSTRACT

A method for improving effectiveness of a steam generator system includes providing a steam generator system including a steam generator vessel, an air supply system and an air preheater. The air supply system is in communication with the steam generator vessel through the air preheater and the steam generator vessel is in communication with the air preheater. The air supply system provides a first amount of air to the air preheater. At least a portion of the first amount
(Continued)

of air is provided to the steam generator vessel. A flue gas mixture is discharged from the steam generator vessel. At least a portion of the flue gas mixture flows into the air preheater. SO₃ in the flue gas mixture is mitigated before the flue gas mixture enters the air preheater.

14 Claims, 15 Drawing Sheets

Related U.S. Application Data a continuation of application No. PCT/US2017/013459, filed on Jan. 13, 2017, which is a continuation of application No. PCT/US2016/055958, filed on Oct. 7, 2016, which is a continuation of application No. 15/205,243, filed on Jul. 8, 2016, now Pat. No. 10,267,517.

(51) Int. Cl.

| | |
|---|---|
| *B01D 53/50* | (2006.01) |
| *F22B 37/00* | (2006.01) |
| *F22B 37/02* | (2006.01) |
| *F23J 15/00* | (2006.01) |
| *F23J 15/06* | (2006.01) |
| *F23J 15/08* | (2006.01) |
| *C02F 1/10* | (2023.01) |
| *F22D 1/36* | (2006.01) |
| *F23K 1/04* | (2006.01) |
| *F23L 15/04* | (2006.01) |

(52) U.S. Cl.
CPC .......... *F22B 37/008* (2013.01); *F22B 37/025* (2013.01); *F23J 15/00* (2013.01); *F23J 15/06* (2013.01); *F23J 15/08* (2013.01); *C02F 1/10* (2013.01); *F22B 37/00* (2013.01); *F22B 37/02* (2013.01); *F22D 1/36* (2013.01); *F23J 15/02* (2013.01); *F23J 2215/20* (2013.01); *F23J 2217/00* (2013.01); *F23K 1/04* (2013.01); *F23L 15/04* (2013.01); *F23L 2900/15043* (2013.01); *Y02E 20/30* (2013.01); *Y02E 20/34* (2013.01)

(58) Field of Classification Search
CPC . F27B 37/025; F23J 15/00; F23J 15/02; F23J 15/022; F23J 15/06; F23J 15/08; F23J 2215/20; F23J 2217/00; F23L 2900/15043; F23L 15/04; Y02E 20/30; Y02E 20/34; C02F 1/10; F22B 37/00; F22B 37/008; F22B 37/02; F22B 37/025; F22D 1/36; F23K 1/04
USPC ......................................................... 110/216
See application file for complete search history.

(56) References Cited

U.S. PATENT DOCUMENTS

| | | | |
|---|---|---|---|
| 2010/0071348 A1 | 3/2010 | Kobayashi et al. | |
| 2011/0308436 A1* | 12/2011 | MacMurray | ........... F23J 15/006 |
| | | | 110/215 |
| 2012/0272626 A1 | 11/2012 | Mitsui et al. | |
| 2015/0139882 A1* | 5/2015 | Warren | ................ F23J 15/003 |
| | | | 423/244.07 |
| 2016/0243494 A1* | 8/2016 | Gansley | ................ B01D 1/14 |
| 2016/0243498 A1* | 8/2016 | Kamiyama | ............. F23J 15/04 |

FOREIGN PATENT DOCUMENTS

| | | | |
|---|---|---|---|
| GB | 2138555 A | | 10/1984 |
| JP | 2002162020 A | * | 6/2002 |
| WO | 2015179644 A1 | | 11/2015 |
| WO | 2017186865 A1 | | 11/2017 |

OTHER PUBLICATIONS

CN-102278768-B—Translation (Year: 2013).*
International search report for corresponding PCT/US2017/041332 dated Oct. 5, 2017.
Ramesh K. Shah, et al., Fundamentals of Heat Exchanger Design, 2003, p. 442, John Wiley & Sons, Inc., Hoboken, New Jersey.
W.M. Kays, et al., Compact Heat Exchangers, 1984, 1964, 1955, pp. 7, 14, 16, 19, 31-32, 39, Third Edition, McGraw-Hill, Inc.

* cited by examiner

FIG. 10

METHOD AND SYSTEM FOR IMPROVING BOILER EFFECTIVENESS

CROSS REFERENCE TO RELATED APPLICATIONS

This application is a national stage application of and claims priority to PCT Application No. PCT/US2017/041332, filed Jul. 10, 2017, which is a continuation application of and claims priority to PCT Application No. PCT/US2017/041078, filed Jul. 7, 2017, which is a continuation application of and claims priority to PCT/US2017/013459, filed Jan. 13, 2017 which is a continuation application of and claims priority to PCT/US2016/055958, filed Oct. 7, 2016, which is a PCT Application of and claims priority to U.S. patent application Ser. No. 15/205,243, filed Jul. 8, 2016, the subject matter of aforementioned applications are hereby incorporated by reference in their entireties.

FIELD OF THE INVENTION

The present invention relates generally to a method and system for improving the effectiveness of a fossil fuel fired steam generator and the effectiveness of particulate removal, and is more particularly directed to a method and system for improving the effectiveness of an air preheater by reducing fouling and improving the thermal efficiency of the fossil fuel fired steam generator and the efficiency of an electrostatic precipitator by using $SO_3$ mitigation upstream of the air preheater and further improving heat rate of the thermal power station comprising the steam generator by facilitating stack gas reheat and/or otherwise.

BACKGROUND OF THE INVENTION

Thermal power stations typically include a fossil fuel fired steam generator system in which fuel (e.g. coal, natural gas and/or oil) is combusted to generate steam to drive turbo-generators feeding electricity to the electrical grid. The overall efficiency of the thermal power station is a measure of the usable electrical power fed to the grid as compared to the energy input to create such output. Energy input includes not only that released by primary fuel combustion in the steam generator vessel, but also secondary energy sources, such as those required to operate auxiliary equipment including fans, pumps and motors, pollution control equipment, inherent thermal conduction losses and often that required to effect stack reheat ensuring appropriate flue gas dispersion to atmosphere.

There are many types of steam generator systems that are employed for the generation of steam for use in the generation of electricity and chemical processing plants. Some of the steam generation systems combust fossil fuel such as coal, natural gas and oil in a steam generator vessel. An air supply to the steam generator vessel is required to provide oxygen for the combustion of the fuel. The combustion of the fuel results in high temperature combustion byproducts in a flue gas stream discharged from the steam generator vessel. To improve the thermal efficiency of the steam generator system the air supply to the steam generator vessel is heated by recovering heat from the flue gas stream in an Air Preheater (APH), such as a rotary APH.

Efficiency of the APH can be increased by using higher efficiency heat transfer elements and heat transfer elements with a greater heat transfer area. However, those skilled in the relevant art have not been able to realize the full potential of increased APH efficiency available through the use of higher efficiency heat transfer elements and greater heat transfer area of the heat transfer elements, because of operation limitations relating to the control of pollutants, as described herein.

The byproducts in the flue gas stream can include particulate matter and pollutants. For example, the combustion of coal results in combustion byproducts such as particulate matter in the form of fly ash and pollutants such as nitrogen oxides ($NO_X$), sulfur dioxide $SO_2$ and sulfur trioxide $SO_3$ (collectively often referred to as $SO_X$). The $SO_2$ is formed as a result of the combustion of sulfur containing fuels such as high sulfur coal. The $SO_3$ is formed by oxidation of the $SO_2$ for example when oxygen content in the flue gas is too high or when the flue gas temperature is too high (e.g., greater than 800° C.). The $SO_3$ can form a liquid aerosol known as sulfuric acid ($H_2SO_4$) mist that is very difficult to remove.

Environmental laws and regulations limit the amount of discharge of particulate matter and pollutants into the environment. Thus, various treatment systems have been employed to control the discharge of particulate matter and pollutants. For example, Selective Catalytic Reduction (SCR) is a treatment means for converting nitrogen oxides, also referred to as $NO_X$, with the aid of a catalyst into diatomic nitrogen ($N_2$) and water ($H_2O$). Particulate control systems such as bag houses, wet Electro Static Precipitators (ESPs) and dry ESPs can be employed to remove particulate matter from the flue gas stream. Dry ESPs are more efficient and easier to maintain than wet ESPs, but dry ESPs require a drier flue gas stream than wet ESPs. Creating a dry flue gas stream can be difficult because as the flue gas temperature decreases below the dew point of $SO_3$ at a cold-end of the APH, condensation can occur, thereby causing $SO_3$ to form $H_2SO_4$ and a relatively wet flue gas. Moreover, if the flue gas contains an $H_2SO_4$ mist, then the less efficient wet ESP is typically employed to remove the $H_2SO_4$. In addition, the ESPs tend to experience dust fouling (e.g., an undesirable accumulation of fly ash on ESP collector plates and removal troughs) when the temperature of the flue gas is high (e.g., 130° C. or greater).

Another system employed for the control of particulate matter and pollutants is a Flue Gas Desulfurization (FGD) system. The FGD systems are primarily directed to removing any $SO_2$, for example, by the use of $SO_2$ absorbers. Wet $SO_2$ absorbers typically spray water mixed with a sorbent on a stream of flue gas flowing through the $SO_2$ absorber to absorb the $SO_2$ from the flue gas. The flue gas exiting the $SO_2$ absorber is saturated with water that contains some $SO_2$. One operational limitation of the FGD systems is the flue gas exiting the $SO_2$ absorber can be highly corrosive to any downstream equipment such as fans, ducts, and stacks. Another operational limitation of the FGD systems is that the $SO_2$ absorbers require a substantial water supply and sorbent regeneration equipment.

One operational limitation relating to APHs is that employing heat transfer elements with increased heat transfer efficiency and area can cause the flue gas temperature to decrease below the dew point of $SO_3$ at which temperature, condensation at a cold-end of the APH can occur. The $SO_3$ reacts with the water to form sulfuric acid $H_2SO_4$ which condenses on the APH heat transfer elements. The particulate matter can adhere to the condensed $H_2SO_4$ causing fouling of the APH. Based on this operational limitation, those skilled in the relevant art have been discouraged from reducing the component temperature and/or flue gas temperature exiting the APH to below the dew point of $SO_3$ and from further employing APH's with increased efficiency heat transfer elements and heat transfer area. This inability to completely realize the full potential of increasing the efficiency of the APH therefore limits the ability to increase the thermal efficiency of the steam generator system to be increased to its full potential.

A detailed discussion of prior art steam generator systems is provided in commonly owned PCT Patent Application PCT/US2017/13459, the subject matter of which is incorporated herein in its entirety.

Based on the foregoing, there is a need for a steam generator system with improved thermal efficiency and particulate matter and pollution treatment systems.

SUMMARY

There is disclosed herein a method for improving effectiveness of a steam generator system. The method includes providing a steam generator system having a steam generator vessel, an air supply system and an air preheater. The air supply system is in communication with the steam generator vessel through the air preheater, and the steam generator vessel is in communication with the air preheater. The air supply system provides a first amount of air to the air preheater and some or all of the first amount of air is provided to the steam generator vessel as combustion air. The method includes discharging from the steam generator vessel a flue gas mixture and flowing at least a portion of the flue gas mixture into the air preheater. The method includes mitigating $SO_3$ in the flue gas mixture before the flue gas mixture enters the air preheater.

In one embodiment, heat capture means ((e.g., heat exchangers, heat transfer elements in the air preheater having a heat transfer capacity in excess of that required to preheat combustion air and/or to cool flue gas to a temperature at or near the dew point of water ($H_2O$), duct arrangements, mixers, tubes, tanks and the like) are in communication with the steam generator, the air preheater, the first amount of air and/or the flue gas mixture. In one embodiment, the method includes transferring a first amount of heat away from the steam generator, the air preheater, the first amount of air and/or the flue gas mixture.

In one embodiment, the method includes providing a particulate removal system and a flue gas desulfurization system. The particulate removal system is located downstream of the air preheater, and the flue gas desulfurization system is located downstream of the particulate removal system. In one embodiment, the method includes discharging all or a portion of the flue gas mixture exiting the steam generator vessel directly from the air preheater to the particulate removal system thereby removing particulate from the flue gas mixture and creating a first treated flue gas mixture. In one embodiment, the method includes discharging the first treated flue gas mixture from the particulate removal system into the flue gas desulfurization system thereby creating in and discharging from the flue gas desulfurization system, a second treated flue gas mixture.

In one embodiment, the first amount of heat is of a magnitude of about 10 to 25 percent of that used to preheat the combustion air. In one embodiment, the first amount of air is of a magnitude in excess of that required as combustion air.

In one embodiment, a flue gas discharge stack is provide in the steam generator system. The steam generator vessel is in communication with the discharge stack through the air preheater, the particulate removal system and/or the flue gas desulfurization system. In one embodiment, the method includes utilizing at least a portion of the first amount of heat to increase the temperature of the flue gas mixture, upstream of an outlet of the stack, to a magnitude sufficient to mitigate visible plume exiting the discharge stack or to mitigate corrosion in the discharge stack.

In one embodiment, the method includes one or more of the following: (1) utilizing at least a portion of the first amount of heat during boiler start up to selectively to preheat at least one of the particulate removal system, the flue gas desulfurization system, and intermediate ducting; (2) utilizing at least a portion of the first amount of heat during boiler operation for a coal drying facility, and subsequently vented to atmosphere; (3) releasing at least a portion of the first amount of heat to atmosphere; (4) utilizing at least a portion of the first amount of heat to improve heat rate of the steam generator system; (5) utilizing at least a portion of the first amount of heat to evaporate water from an ash slurry discharged from a wet ash removal system in communication with at least one of the particulate removal system and the steam generator vessel; and (6) utilizing at least a portion of the first amount of heat in a waste water system to reduce water discharge therefrom.

In one embodiment, improving of the heat rate includes one or more of the following: (1) utilizing at least a portion of the first amount of heat to improve steam cycle efficiency; (2) utilizing at least a portion of the first amount of heat to preheat feed water or condensate supplied to the steam generator system; and (3) utilizing at least a portion of the first amount of heat to reduce parasitic loads (e.g., space and potable water heating and steam for turbines for driving rotating equipment such as fans in lieu of electric driven motors, and other steam or heat loads other than for steam used for generating electricity) in the steam generator system.

In one embodiment, the method includes supplying at least one of a portion of the flue gas mixture and a portion of the first amount of air to the waste water system to evaporate waste water therein, creating particulate waste in the waste water system, and transporting the particulate waste to the particulate removal system.

In one embodiment, the mitigating the $SO_3$ in the flue gas mixture includes chemical rendering and/or supplying low sulfur fuel to the steam generator system.

In one embodiment, the air preheater is configured to heat the first amount of air to about 288° C. to 399° C. (550° F. to 750° F.).

In one embodiment, the air supply system provides the first amount of air to the air preheater at a mass flow sufficient to establish a first temperature of a flue gas mixture exiting the air preheater, the first temperature being such that the air preheater has a cold end outlet temperature defined by the improved air preheater operating with increased heat recovery (HR) of at least 1% as calculated according to the equation:

$$HR = 100\% \times ((Tgi - TgoAdvX)/(Tgi - TgoSTD) - 1).$$

In one embodiment, the air preheater has a cold end metal temperature that is no less than (e.g., not substantially less than, approximately equal to or not substantially greater than) a water dew point temperature in the air preheater and such that the cold end metal temperature is less than a sulfuric acid dew point temperature and the first temperature being from about 105° C. (220° F.) to about 125° C. (257° F.). As used herein, the term "no less than a water dew point temperature" connotes a temperature that is approximately equal to the water dew point temperature such that there is no permanent wetting of the heat transfer elements in the air preheater that causes corrosion of fouling.

In one embodiment, the air preheater has a cold end metal temperature that is within 0.5 degrees Celsius of the water dew point temperature in the air preheater. In one embodiment, the air preheater has a cold end metal temperature that is within 1 degree Celsius of the water dew point temperature in the air preheater. In one embodiment, the air preheater has a cold end metal temperature that is within 2 degrees Celsius of the water dew point temperature in the air preheater. In one embodiment, the air preheater has a cold end metal temperature that is within 3 degrees Celsius of the water dew point temperature in the air preheater. In one embodiment, the air preheater has a cold end metal temperature that is within 4 degrees Celsius of the water dew point temperature in the air preheater. In one embodiment, the air preheater has a cold end metal temperature that is within 5 degrees Celsius of the water dew point temperature in the air preheater.

There is further disclosed herein a method for retrofitting a steam generator system to be configured to operate according to methods. In the retrofitting embodiment, the discharging the first treated flue gas mixture from the particulate removal system directly into the flue gas desulfurization system, includes the use of one or more heat exchangers existing in the steam generator system, between the particulate removal system and the flue gas desulfurization system, prior to the retrofitting.

There is further disclosed herein, a steam generator system configured to operate according to the foregoing methods.

There is disclosed herein a method for improving effectiveness of a steam generator system. The method includes providing a steam generator system having a steam generator vessel, an air supply system, an improved air preheater (e.g., an AdvX™ air preheater, formerly given the development name AXRM™), a particulate removal system (e.g., a dry electro static precipitator and/or a fabric filter), a flue gas desulfurization system, and a flue gas discharge stack. The air supply system is in communication with the steam generator vessel through the air preheater. The steam generator vessel is in communication with the discharge stack through the air preheater, the particulate removal system and the flue gas desulfurization system. The particulate removal system is located downstream of the air preheater. The flue gas desulfurization system is located downstream of the particulate removal system and the discharge stack is located downstream of the flue gas desulfurization system. The method includes having the air supply system provide a first amount of air to the air preheater at a mass flow sufficient to establish a first temperature of a flue gas mixture exiting the air preheater. The first temperature is of a magnitude such that the air preheater has a cold end outlet temperature defined by the improved air preheater operating with increased heat recovery (HR) of at least 1% as calculated according to the equation:

$$HR = 100\% \times ((Tgi - TgoAdvX)/(Tgi - TgoSTD) - 1),$$

wherein

Tgi=Flue gas inlet temperature, i.e. of flue gas mixture entering the air preheater;
TgoAdvX=Flue gas outlet temperature, i.e. of flue gas mixture exiting the improved air preheater;
TgoSTD=Flue gas outlet temperature, i.e. of flue gas mixture exiting the standard air preheater.

The method includes mitigating $SO_3$ in the flue gas mixture generated in the steam generator vessel. The mitigating of $SO_3$ occurs before the flue gas mixture enters the air preheater. The method includes configuring the air preheater to heat the first amount of air to a second temperature of about 288° C. to 399° C. (550° F. to 750° F.). The method also includes supplying a first portion or all of the first amount of air as combustion air to the steam generator vessel for combustion of the fuel. The flue gas mixture is discharged at the first temperature, directly from the air preheater to the particulate removal system thereby removing particulate from the flue gas mixture and creating a first treated flue gas mixture. The method further includes discharging all or a portion of the first treated flue gas mixture exiting the steam generator vessel from the particulate removal system directly into the flue gas desulfurization system thereby creating in and discharging from the flue gas desulfurization system, a second treated flue gas mixture at a third temperature, for example, but not limited to 52° C. to about 60° C. (125° F. to 140° F.). The third temperature is of a magnitude sufficient to facilitate injection of a second portion of air as flue gas reheat air heating, directly (e.g., via mixing) or indirectly (e.g., using a heat exchanger), the second treated flue gas mixture at the third temperature thereby creating third treated flue gas mixture at a fourth temperature (e.g., at least about 68° C. (155° F.)), prior to entering the discharge stack. The third temperature is of a magnitude sufficient to allow the flue gas reheat air to raise the fourth temperature to a magnitude sufficient to mitigate visible plume exiting the discharge stack and to mitigate corrosion in the discharge stack. Finally, the method includes admitting the third treated flue gas mixture to the discharge stack at the fourth temperature.

In one embodiment, the first amount of air is of a magnitude in excess of that required for combustion of fuel in the steam generator vessel and the second portion of air is a second portion of the first amount of air fed from the air preheater at the second temperature. While, in another embodiment, the flue gas mixture is upstream of the air preheater divided into two streams in which a first stream is the said portion of the flue gas mixture fed to and then discharged from the air preheater and in which the second stream is bled via ducting upstream of the air preheater. In that another embodiment, the second stream is subsequently fed through a heat exchanger and injected to recombine with the first stream downstream of the air preheater. Typically, the second stream is subsequently fed through a heat exchanger and the second portion of air is heated by the second stream of flue gas in the heat exchanger prior to injection as flue gas reheat air.

In one embodiment, the air preheater has a cold end metal temperature that is no less than a water dew point temperature in the air preheater and such that the cold end metal temperature is less than a sulfuric acid dew point temperature and the first temperature being from about 105° C. (220° F.) to about 125° C. (257° F.).

In one embodiment, a third portion of the first amount of air is provided as preheat air during boiler start up selectively to preheat one or more of the particulate removal system, the flue gas desulfurization system, and/or intermediate ducting, or during boiler operation for a coal drying facility, and subsequently vented to atmosphere. In another embodiment, the second stream of flue gas mixture is subsequently fed through a heat exchanger to heat an air stream providing the second portion of air for injection as flue gas reheat air. Additionally in that another embodiment, the air stream provides a third portion of air as preheat air during boiler start up selectively to preheat at least one of the particulate removal system, the flue gas desulfurization system, intermediate ducting, or during boiler operation for a coal drying facility, and subsequently vented to atmosphere.

In one embodiment, the steam generator system further includes a selective catalytic reduction system and the steam generator vessel is in communication with the air preheater through the selective catalytic reduction system.

In one embodiment, the steam generator system further includes one or more of a flue gas reheat air and/or a preheat air particulate removal system and the air preheater is in communication with the discharge stack through the flue gas reheat air and/or preheat air particulate removal system. The flue gas reheat air and/or the preheat air particulate removal system removes particulate contaminants from the second portion of air that are introduced to the second portion of air from leakage within the air preheater (e.g., for example by the use of inefficient or damages sector seals) from the flue gas mixture.

In one embodiment, the steam generator system further includes a humidity sensor disposed between the steam generator vessel and the air preheater and the method includes measuring, with the humidity sensor, the humidity of the flue gas mixture to determine a magnitude of first temperature.

In one embodiment, the steam generator system further includes an infrared sensor and the method includes determining, with the infrared sensor, the cold end metal temperature in the air preheater; comparing the cold end metal temperature to the water dew point temperature; and controlling the cold end metal temperature to be no less than the water dew point temperature.

In one embodiment, the mitigating of $SO_3$ in the flue gas mixture includes supplying a low sulfur fuel to the steam generator vessel, wherein the low sulfur fuel generates less than 5 parts per million $SO_3$.

In one embodiment, the mitigating $SO_3$ in the flue gas mixture includes removing $SO_3$ in the flue gas mixture prior to admitting the flue gas mixture to the air preheater.

In one embodiment, the mitigating $SO_3$ in the flue gas mixture includes chemically rendering the $SO_3$ in the flue gas mixture into an inert salt, prior to admitting the flue gas mixture to the air preheater. For example, the chemically rendering may include spraying an aqueous suspension of a reagent either containing sodium, magnesium, potassium, ammonium and/or calcium thiosulfate and containing a soluble salt compound such as one or more of thiosulfate and chloride species or containing at least one of sodium carbonate, sodium bicarbonate, sodium hydroxide, ammonium hydroxide, potassium hydroxide, potassium carbonate and potassium bicarbonate to create a particulate mist containing dry particles of at least one soluble salt compound that can react with the $SO_3$ in the flue gas.

In one embodiment, the method includes further providing an injection device (e.g., a duct manifold) between the flue gas desulfurization system and the discharge stack and wherein the injecting of the second portion of air, at the second temperature, with the second flue treated flue gas mixture at the third temperature occurs in the injection device.

In one embodiment, the injection device includes the duct manifold positioned between the flue gas desulfurization system and the discharge stack. The duct manifold has an inlet for receiving the second treated flue gas mixture, a branch connection for receiving the second portion of air and an outlet in communication with the discharge stack. In one embodiment, the injection device includes a mixer, turning vanes, and/or a tabulator device.

In one embodiment, the discharging the flue gas mixture at the first temperature, directly from the air preheater to the particulate removal system is accomplished with no heat exchangers disposed between the air preheater and the particulate removal system.

In one embodiment, the discharging the first treated flue gas mixture from the particulate removal system directly into the flue gas desulfurization system is accomplished with no heat exchangers disposed between the particulate removal system and the flue gas desulfurization system.

In one embodiment, there are no heat exchangers disposed between the air preheater and the flue gas desulfurization system.

In one embodiment, there are no fans disposed between the flue gas desulfurization system and the discharge stack.

In one embodiment, the injection of the second portion of the first amount of air is conducted at a mass ratio of the second portion to the second treated flue gas mixture of 1 percent to 16 percent. In one embodiment, the injection of the second portion of the first amount of air is conducted at a mass ratio of the second portion to the second treated flue gas mixture of 9 percent to 16 percent.

There is disclosed herein a method for improving effectiveness of a steam generator system. The method includes providing a steam generator system that includes a steam generator vessel, an air supply system, an improved air preheater, a particulate removal system and a flue gas discharge stack. The air supply system is in communication with the steam generator vessel through the air preheater and the steam generator vessel is in communication with the discharge stack through the air preheater and the particulate removal system. The particulate removal system is located downstream of the air preheater and the discharge stack is located downstream of the particulate removal system. The air supply system provides a first amount of air to the air preheater at a mass flow sufficient to establish a first temperature of a flue gas mixture exiting the air preheater. The first temperature is such that the air preheater has a cold end outlet temperature defined by the improved air preheater operating with increased heat recovery (HR) of at least 1% as calculated according to the equation:

$$HR=100\%\times((Tgi-TgoAdvX)/(Tgi-TgoSTD)-1),$$
wherein

Tgi=Flue gas inlet temperature, i.e. of flue gas mixture entering the air preheater;
TgoAdvX=Flue gas outlet temperature, i.e. of flue gas mixture exiting the improved air preheater;
TgoSTD=Flue gas outlet temperature, i.e. of flue gas mixture exiting the standard air preheater.

The method includes mitigating $SO_3$ in the flue gas mixture generated in the steam generator vessel, wherein the mitigating of $SO_3$ occurs before the flue gas mixture enters the air preheater. The air preheater is configured to heat the first amount of air to a second temperature of about 288° C. to 399° C. (550° F. to 750° F.). A first portion or all of the first amount of air is supplied as combustion air to the steam generator vessel for combustion of the fuel. The or at least a portion of the flue gas mixture is discharged, at the first temperature, directly from the air preheater to the particulate removal system thereby removing particulate from the flue gas mixture and creating a first treated flue gas mixture. The first treated flue gas mixture is discharged from the particulate removal system directly into the flue gas desulfurization system thereby creating in and discharging from the flue gas desulfurization system, a second treated flue gas mixture at a third temperature. The third temperature is of a magnitude sufficient to facilitate injection of a second portion of air as preheat air, providing heat to a coal drying facility and/or to preheat the steam generator vessel.

In one embodiment, the air preheater has a cold end metal temperature that is no less than a water dew point temperature in the air preheater and such that the cold end metal temperature is less than a sulfuric acid dew point temperature and the first temperature being from about 105° C. (220° F.) to about 125° C. (257° F.).

There is disclosed herein a system for improving effectiveness of a steam generator system. The system includes a steam generator vessel, an air preheater in communication with the steam generator vessel, an air supply system configured to provide air to the steam generator vessel through the air preheater, a particulate removal system (e.g., a dry electro static precipitator and/or a fabric filter), a flue gas desulfurization system and a discharge stack. The steam generator vessel is in communication with the discharge stack through the air preheater, the particulate removal system and the flue gas desulfurization system. The particulate removal system is located directly downstream of the air preheater. The flue gas desulfurization system is located directly downstream of the particulate removal system. The discharge stack is located directly downstream of the flue gas desulfurization system. The air supply system is configured to provide a first amount of air to the air preheater at a mass flow sufficient to establish a first temperature of a flue gas mixture exiting the air preheater. The first temperature is of a magnitude such that the air preheater has a cold end metal temperature that is no less than a water dew point temperature in the air preheater and such that the cold end metal temperature is less than a sulfuric acid dew point temperature. The first temperature is from about 105° C. (220° F.) to about 125° C. (257° F.). The system includes $SO_3$ mitigation upstream of the air preheater, the $SO_3$ mitigation is configured to mitigate $SO_3$ in the flue gas mixture generated in the steam generator vessel. The air preheater is configured to heat the first amount of air to a second temperature of about 288° C. to 399° C. (550° F. to 750° F.). The particulate removal system is configured to convey the flue gas mixture at a third temperature, for example, but not limited to 52° C. to about 60° C. (125° F. to 140° F.), directly to the flue gas desulfurization system. An excess air duct is in communication with the air preheater. A second duct is positioned between the flue gas desulfurization system and the discharge stack. The excess air duct is configured to convey a second portion of the first amount of air as flue gas reheat air fed from the air preheater at the second temperature from the air preheater to the second duct. The system includes an injection device (e.g., a duct manifold) located between the flue gas desulfurization system and the discharge stack. The injection device is configured to discharge the flue gas into the discharge stack at a fourth temperature (e.g., at least about 68° C. (155° F.)). The third temperature is of a magnitude sufficient to allow the flue gas reheat air to raise the fourth temperature to a magnitude sufficient to mitigate visible plume exiting the discharge stack and to mitigate corrosion in the discharge stack.

In one embodiment, the steam generator system further includes a selective catalytic reduction system and the steam generator vessel is in communication with the air preheater through the selective catalytic reduction system.

In one embodiment, the steam generator system further includes a flue gas reheat air particulate removal system and the air preheater is in communication with the discharge stack through the flue gas reheat air particulate removal system operatively to remove from the second portion of air particulate contaminants introduced from leakage within the air preheater from the flue gas mixture.

In one embodiment, the steam generator system further comprises a humidity sensor disposed in the communication between the steam generator vessel and the air preheater to measure humidity of the flue gas mixture and with the humidity sensor being used to determine the magnitude of first temperature.

In one embodiment, the steam generator system further comprises an infrared sensor to determine the air preheater temperature and a control unit configured to control the cold end metal temperature above the water dew point in the air preheater.

In one embodiment, the $SO_3$ mitigation includes supplying a low sulfur fuel to the steam generator vessel. The low sulfur fuel generates less than 5 parts per million $SO_3$.

In one embodiment, the $SO_3$ mitigation includes removing $SO_3$ in the flue gas mixture prior to admitting the flue gas mixture to the air preheater.

In one embodiment, the $SO_3$ mitigation includes chemically rendering the $SO_3$ in the flue gas mixture into an inert salt, prior to admitting the flue gas mixture to the air preheater. For example, the chemically rendering may include spraying an aqueous suspension of a reagent either containing sodium, magnesium, potassium, ammonium and/or calcium thiosulfate and containing one or more soluble salt compounds such as thiosulfate and chloride species or containing at least one of sodium carbonate, sodium bicarbonate, sodium hydroxide, ammonium hydroxide, potassium hydroxide, potassium carbonate and potassium bicarbonate to create a particulate mist containing dry particles of at least one soluble salt compound that can react with the $SO_3$ in the flue gas.

In one embodiment, the system is configured with no fans disposed between the flue gas desulfurization system and the discharge stack.

In one embodiment, the system is configured with no heat exchangers disposed between the air preheater and the flue gas desulfurization system.

In one embodiment, the system is configured with no fans disposed between the flue gas reheat air particulate removal system and the discharge stack.

There is further disclosed herein a method for retrofitting a steam generator system for improved effectiveness. The method includes removing one or more heat exchangers positioned downstream of the air preheater and reconfiguring an air supply source to the air preheater to supply a first amount of at a mass flow sufficient to establish a first temperature of a flue gas mixture exiting the air preheater. The first temperature is of a magnitude such that the air preheater has a cold end metal temperature that is no less than a water dew point temperature in the air preheater and such that the cold end metal temperature is less than a sulfuric acid dew point temperature. The first temperature is from about 105° C. (220° F.) to about 125° C. (257° F.). The method includes providing $SO_3$ mitigation in communication with the steam generator vessel. The $SO_3$ mitigation is configured to mitigate the $SO_3$ in the flue gas mixture generated in the steam generator vessel. The mitigating of $SO_3$ occurs before the flue gas mixture enters the air preheater. The method includes configuring the air preheater to heat the first amount of air to a second temperature which is substantially no less than the temperature of combustion air of an original system and being about of 288° C. to 399° C. (550° F. to 750° F.) to maintain or improve boiler efficiency. The method includes supplying a first portion or all of the first amount of air to the steam generator vessel for combustion of the fuel. The method further includes discharging all or a portion of the flue gas mixture exiting the steam generator vessel at the first temperature, directly from the air preheater to the particulate collection system, thereby removing particulate from the flue gas mixture and creating a first treated flue gas mixture. The method also includes, discharging the first treated flue gas mixture from the particulate removal system directly into the flue gas desulfurization system thereby creating in and discharging from the flue gas desulfurization system, a second treated flue gas mixture at a third temperature, for example, but not limited to 52° C. to about 60° C. (125° F. to 140° F.). The method includes injecting a second portion of air as flue gas reheat air with the second flue treated flue gas mixture at the third temperature, thereby creating third treated flue gas mixture at a fourth temperature (e.g., at least about 68° C. (155° F.)), prior to entering the discharge stack. The method also includes, admitting the third treated flue gas mixture to the discharge stack at the fourth temperature. The third temperature is of a magnitude sufficient to allow the flue gas reheat air to raise the fourth temperature to a magnitude sufficient to mitigate visible plume exiting the discharge stack and to mitigate corrosion in the discharge stack.

In one embodiment, the retrofit method includes replacing at least a portion of an outlet duct connecting the flue gas desulfurization system and the discharge stack with a manifold that connects the flue gas desulfurization system, an excess air duct and the discharge stack.

In one embodiment, the steam generator system further includes a flue gas reheat air particulate removal system, and the air preheater is in communication with the discharge stack through the flue gas reheat air particulate removal system. The retrofit method includes removing particulate contaminants from the second portion of air, the particulate contaminants being introduced to the second portion of air from leakage within the air preheater from the flue gas mixture.

In one embodiment, the steam generator system further includes a humidity sensor disposed in the communication between the steam generator vessel and the air preheater and the retrofit method includes measuring, with the humidity sensor, humidity of the flue gas mixture to determine a magnitude of first temperature.

In one embodiment, the steam generator system further includes an infrared sensor and the retrofit method includes determining, with the infrared sensor, the cold end metal temperature in the air preheater, comparing the cold end metal temperature to the water dew point temperature; and controlling the cold end metal temperature to be no less than the water dew point temperature.

In one embodiment, in the retrofit method a second thermal efficiency of the steam generator system, after implementing the retrofit method, is at least as great as a first thermal efficiency of the steam generator system before implementing the retrofit method.

There is further disclosed herein a method for retrofitting a wet stack steam generator system capable of flue gas outlet velocities in the order of 55 to 60 feet per second for improved effectiveness. The method includes eliminating the wet stack, thereby permitting increased flue gas outlet velocities by reconfiguring an air supply source to the air preheater to supply a first amount of air at a mass flow sufficient to establish a first temperature of a flue gas mixture exiting the air preheater, the first temperature being such that the air preheater has a cold end outlet temperature defined by the improved air preheater operating with increased heat recovery HR of at least 1% as calculated according to the equation:

$$HR = 100\% \times ((Tgi - TgoAdvX)/(Tgi - TgoSTD) - 1),$$

wherein

Tgi=Flue gas inlet temperature, i.e. of flue gas mixture entering the air preheater;

TgoAdvX=Flue gas outlet temperature, i.e. of flue gas mixture exiting the improved air preheater;

TgoSTD=Flue gas outlet temperature, i.e. of flue gas mixture exiting the standard air preheater.

The method includes providing $SO_3$ mitigation in communication with the steam generator vessel. The $SO_3$ mitigation is configured to mitigate the $SO_3$ in the flue gas mixture generated in the steam generator vessel. The mitigating of $SO_3$ occurs before the flue gas mixture enters the air preheater. The method includes configuring the air preheater to heat the first amount of air to a second temperature that is substantially no less than the temperature of combustion air of an original system and being about of 288° C. to 399° C. (550° F. to 750° F.) to maintain or improve boiler efficiency compared to the original system. The method includes supplying a first portion or all of the first amount of air to the steam generator vessel for combustion of the fuel. The method further includes discharging all or a portion of the flue gas mixture exiting the steam generator vessel at the first temperature, directly from the air preheater to the particulate collection system thereby removing particulate from the flue gas mixture and creating a first treated flue gas mixture. The first treated flue gas mixture is discharged from the particulate removal system directly into the flue gas desulfurization system, thereby creating in and discharging from the flue gas desulfurization system, a second treated flue gas mixture at a third temperature. The method includes injecting a second portion of the first amount of air as flue gas reheat air with the second flue treated flue gas mixture at the third temperature, thereby creating third treated flue gas mixture at a fourth temperature, prior to entering the discharge stack. The method includes admitting the third treated flue gas mixture to the discharge stack at the fourth temperature. The third temperature is of a magnitude sufficient to allow the flue gas reheat air to raise the fourth temperature to a magnitude sufficient facilitate a dry stack to mitigate visible plume exiting the discharge stack and to mitigate corrosion in the discharge stack. The retrofitted steam generator system is capable of running at increased loads compared to the original steam generator system (i.e., before implementing the retrofit) at which the flue gas outlet velocities exceeds those previously permitted with a wet stack.

In one embodiment, the air preheater has a cold end metal temperature that is no less than a water dew point temperature in the air preheater and such that the cold end metal temperature is less than a sulfuric acid dew point temperature and the first temperature being from about 105° C. (220° F.) to about 125° C. (257° F.).

There is further disclosed herein a method for improving effectiveness of a steam generator system. The method includes providing a steam generator system that includes a steam generator vessel, an air supply system, an air preheater, a first particulate removal system, a second particulate removal system, a flue gas desulfurization system, and a flue gas discharge stack. The air supply system is in communication with the steam generator vessel through the air preheater and the steam generator vessel is in communication with the discharge stack through the air preheater, the first particulate removal system and the flue gas desulfurization system. The first particulate removal system is located downstream of the air preheater and the flue gas desulfurization system is located downstream of the first particulate removal system. The discharge stack is located downstream of the flue gas desulfurization system and the air preheater is in communication with the discharge stack through the second particulate removal system. The method also includes providing a humidity sensor disposed between the steam generator vessel and the air preheater; and providing an infrared sensor in the air preheater. The method includes measuring the humidity of a flue gas mixture with the humidity sensor to determine a magnitude of a first temperature. The air supply system provides a first amount of air to the air preheater. The first amount of air is at a mass flow sufficient to establish a first temperature of a flue gas mixture exiting the air preheater. The first temperature is of a magnitude such that the air preheater has a cold end metal temperature that is no less than a water dew point temperature in the air preheater and such that the cold end metal temperature is less than a sulfuric acid dew point temperature. The first temperature is from about 105° C. (220° F.) to about 125° C. (257° F.). The method includes determining, with the infrared sensor, the cold end metal temperature in the air preheater, comparing the cold end metal temperature to the water dew point temperature; and controlling the cold end metal temperature to be no less than the water dew point temperature. The method includes mitigating $SO_3$ in the flue gas mixture generated in the steam generator vessel. The mitigating of $SO_3$ occurs before the flue gas mixture enters the air preheater. The method includes configuring the air preheater to heat the first amount of air to a second temperature of about 288° C. to 399° C. (550° F. to 750° F.) and supplying a first portion or all of the first amount of air as combustion air to the steam generator vessel for combustion of the fuel. The method includes discharging all or a portion of the flue gas mixture exiting the steam generator vessel at the first temperature, directly from the air preheater to the particulate removal system, thereby removing particulate from the flue gas mixture and creating a first treated flue gas mixture. The method includes discharging the first treated flue gas mixture from the particulate removal system directly into the flue gas desulfurization system thereby creating in and discharging from the flue gas desulfurization system, a second treated flue gas mixture at a third temperature of 52° C. to 60° C. (125° F. to 140° F.). The method includes removing particulate contaminants from the second portion of air. The particulate contaminants are introduced to the second portion of air from leakage within the air preheater from the flue gas mixture. The method further includes injecting a second portion of the first amount of air as flue gas reheat air fed from the air preheater at the second temperature with the second flue treated flue gas mixture at the third temperature, thereby creating third treated flue gas mixture at a fourth temperature of at least 68° C. (155° F.), prior to entering the discharge stack. The method also includes admitting the third treated flue gas mixture to the discharge stack at the fourth temperature.

There is disclosed herein a method for operating a steam generator system which includes providing a steam generator system comprising a steam generator vessel, an air supply system and an air preheater, the air supply system comprising regulating means, and the air preheater comprising a plurality of heat transfer elements therein, providing at least one sensor, with the air supply system being in communication with the steam generator vessel through the air preheater, and with the steam generator vessel being in communication with the air preheater; providing a control unit controlling the steam generator system. The air supply system provides, and the regulating means regulates, a first amount of air to the air preheater at a mass flow. The mass flow is sufficient to establish a first temperature of a flue gas mixture exiting the air preheater. The first temperature is determined using the at least one sensor and is such that the air preheater has a cold end outlet temperature defined by the air preheater operating with a heat recovery (HR) of at least 1% as calculated according to the equation:

$$HR = 100\% \times ((Tgi - T1)/(Tgi - TgoSTD) - 1), \text{ wherein:}$$

Tgi=inlet temperature of the flue gas mixture entering the air preheater;

T1—outlet temperature of the flue gas mixture exiting the air preheater;

TgoSTD=outlet temperature of the flue gas mixture exiting a standard air preheater, in which the first amount of air is of a magnitude equal to that required for combustion and as having a rotor diameter and depth equivalent to that of the air preheater.

The method includes providing at least a portion of the first amount of air to the steam generator vessel as combustion air; discharging from the steam generator vessel the flue gas mixture; flowing at least a portion of the flue gas mixture into the air preheater; and mitigating $SO_3$ in the flue gas mixture before the flue gas mixture enters the air preheater. The plurality of heat transfer elements are configured to have a temperature of the mass flow of the combustion air supplied to the steam generator vessel via the air preheater at about 288° C. to 399° C. (550° F. to 750° F.) for combustion of fuel in the steam generator vessel; and the control unit controls a cold end metal temperature to be no less than a water dew point temperature in the air preheater and such that the cold end metal temperature is less than a sulfuric acid dew point temperature and the first temperature is from about 105° C. (220° F.) to about 125° C. (257° F.), as measured by the at least one sensor. \

In one embodiment, the method includes providing heat capture means in communication with at least one of the air preheater and the flue gas mixture; and transferring a first amount of heat away from at least one of the air preheater and the flue gas mixture.

In one embodiment, the first amount of heat is of a first magnitude which is about 10 to 25 percent of a second magnitude of heat, the second magnitude of heat being used to preheat the combustion air.

In one embodiment, the first amount of air is of a magnitude in excess of that required as combustion air.

In one embodiment, the method includes providing a flue gas discharge stack, with the steam generator vessel being in communication with the discharge stack through at least one of the air preheater, the particulate removal system and the flue gas desulfurization system; and utilizing at least a portion of the first amount of heat to increase the temperature of the flue gas mixture, upstream of an outlet of the stack, to a magnitude sufficient to mitigate visible plume exiting the discharge stack or to mitigate corrosion in the discharge stack.

In one embodiment, the method includes: utilizing at least a portion of the first amount of heat during boiler start up to selectively to preheat at least one of the particulate removal system, the flue gas desulfurization system, and intermediate ducting; utilizing at least a portion of the first amount of heat during boiler operation for a coal drying facility, and subsequently vented to atmosphere; releasing at least a portion of the first amount of heat to atmosphere; utilizing at least a portion of the first amount of heat to improve heat rate of the steam generator system; utilizing at least a portion of the first amount of heat to preheat feed water or condensate supplied to the steam generator system; utilizing at least a portion of the first amount of heat to evaporate water from an ash slurry discharged from a wet ash removal system in communication with at least one of the particulate removal system and the steam generator vessel; and utilizing at least a portion of the first amount of heat in a waste water system to reduce water discharge therefrom.

In one embodiment, the method includes providing a particulate removal system and a flue gas desulfurization system, with the particulate removal system being located downstream of the air preheater, and with the flue gas desulfurization system being located downstream of the particulate removal system; discharging all or a portion of the flue gas mixture exiting the steam generator vessel directly from the air preheater to the particulate removal system thereby removing particulate from the flue gas mixture and creating a first treated flue gas mixture; and/or discharging the first treated flue gas mixture from the particulate removal system directly into the flue gas desulfurization system thereby creating in and discharging from the flue gas desulfurization system, a second treated flue gas mixture.

In one embodiment, the method includes supplying at least one of: (a) a portion of the first amount of air to the waste water system to evaporate waste water therein; and (b) a portion of the first amount of air and a portion of the flue gas mixture to the waste water system to evaporate waste water therein; creating particulate waste in the waste water system; and transporting the particulate waste to the particulate removal system.

In one embodiment, the mitigating the $SO_3$ in the flue gas mixture comprises at least one of: chemical rendering; and supplying low sulfur fuel to the steam generator system.

In one embodiment, the chemical rendering includes: (a) chemically rendering the $SO_3$ in the flue gas mixture into an inert salt, prior to admitting the flue gas mixture (FG) to the air preheater; (b) spraying an aqueous suspension of a reagent containing sodium, magnesium, potassium, ammonium and/or calcium thiosulfate; and (i) containing at least one soluble salt compound; or (ii) containing at least one of sodium carbonate, sodium bicarbonate, sodium hydroxide, ammonium hydroxide, potassium hydroxide, potassium carbonate and potassium bicarbonate; (c) creating a particulate mist containing dry particles of at the least one soluble salt compound; and (d) reacting the particulate mist with the $SO_3$ in the flue gas.

There is disclosed herein a method for retrofitting a steam generator system to be configured to operate according to the foregoing.

In one embodiment, the method for retrofitting a steam generator of includes the discharging the first treated flue gas mixture from the particulate removal system directly into the flue gas desulfurization system, comprises the use of at least one heat exchanger existing in the steam generator system, between the particulate removal system and the flue gas desulfurization system, prior to the retrofitting.

There is disclosed herein a steam generator system configured to operate according to the foregoing.

There is disclosed herein a method for operating a steam generator system which includes providing a steam generator system comprising a steam generator vessel, an air supply system, an air preheater, a particulate removal system and a waste water system, with the air supply system being in communication with the steam generator vessel through the air preheater, with the steam generator vessel being in communication with the air preheater, the waste water system being in communication with the steam generator system and the particulate removal system being located downstream of the air preheater; the air supply system providing a first amount of air to the air preheater; providing at least a portion of the first amount of air to the steam generator vessel as combustion air; discharging from the steam generator vessel a flue gas mixture; flowing at least a portion of the flue gas mixture into the air preheater; and mitigating $SO_3$ in the flue gas mixture before the flue gas mixture enters the air preheater; supplying at least one of: (a) a portion of the first amount of air to the waste water system to evaporate waste water therein; and (b) a portion of the first amount of air and a portion of the flue gas mixture to the waste water system to evaporate waste water therein; creating particulate waste in the waste water system; and transporting the particulate waste to the particulate removal system.

It is contemplated that any of the foregoing embodiments can be combined.

BRIEF DESCRIPTION OF THE DRAWINGS

FIG. 10 is a schematic flow diagram of a yet further embodiment of the steam generator of the present invention including a waste water drying loop;

DETAILED DESCRIPTION

Figure 1:
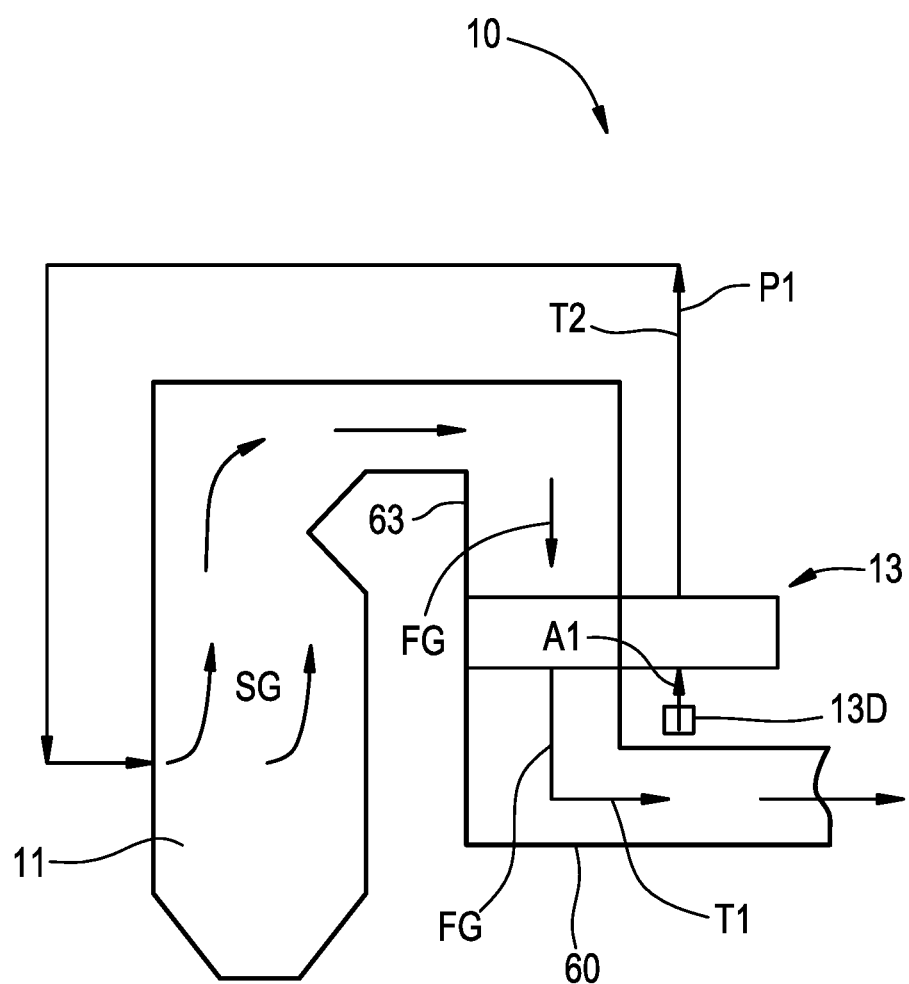
FIG. 1 is a schematic flow diagram of a portion of a steam generator system illustrating the present invention.

As shown in FIG. 1, a steam generator system having an improved effectiveness is generally designated by the numeral 10. The steam generator system 10 includes a steam generator vessel 11 and an air preheater 13 (e.g., a rotary regenerative heat exchanger of the inventor's AdvX™ design, AdvX™ is a trademark of Arvos Ljungstrom LLC). The AdvX™ air preheater 13 is in communication with the steam generator vessel 11 via a duct 63. The steam generator system 10 includes an air supply system 13D configured to provide air to the steam generator 11 through the air preheater 13. As used herein the term "improved effectiveness" of the steam generator system includes: 1) maintaining the overall thermal efficiency of the steam generator system 10 while eliminating or otherwise mitigating the need for heat exchangers such as gas-gas heat exchangers (GGHs) between the air preheater 13 and a discharge stack; 2) reducing fouling in the air preheater 13; 3) improving the efficiency of a particulate removal system; 4) improving the efficiency of the air preheater 13; and/or 5) improving the overall thermal efficiency (i.e., heat rate) of the steam generator system 10 compared to prior art steam generator systems (e.g., the steam generator systems 100 and 100' of FIGS. 1 and 2 of PCT Patent Application PCT/US2017/13459). Through significant analysis and testing and many years of unsuccessful attempts, the inventors have surprisingly discovered the steam generator system 10 can operate at least as thermally efficiently as the prior art steam generator systems 100 shown in PCT Patent Application PCT/US2017/13459 but without the efficiency enhancing benefit of the GGHs 106X, 106X', 106Y and 106Y' as shown in PCT Patent Application PCT/US2017/13459. The term "a method for improving effectiveness of a steam generator system," is also referred to as a method for operating a steam generator system.

As shown in FIG. 1, the steam generator system 10 includes the steam generator vessel 11, an air supply system 13D and the air preheater 13. The air supply system 13D is in communication with the steam generator vessel 11 through the air preheater 13 and the steam generator vessel 11 is in communication with the air preheater 13. The air supply system 13D provides a first amount of air to the air preheater 13. At least a portion of the first amount of air is provided to the steam generator vessel 11 as combustion air. A flue gas mixture FG is discharged from the steam generator vessel 11 via the duct 63. All or a portion of the flue gas mixture FG flows into the air preheater 13. $SO_3$ in the flue gas mixture is mitigated before the flue gas mixture FG enters the air preheater 13, as described further herein.

The steam generator system 10 includes heat capture means (e.g., heat exchangers, heat transfer elements in the air preheater having a heat transfer capacity in excess of that required to preheat combustion air and/or to cool flue gas so that the cold end metal temperature is of a temperature at or near the dew point of water ($H_2O$), duct arrangements, mixers, tubes, tanks and the like) in communication with the steam generator, the air preheater, the first amount of air and/or the flue gas mixture, as described further herein. The first amount of heat is transferred away from the steam generator, the air preheater, and/or the flue gas mixture to various locations as described herein. For example, all or a portion of the first amount of heat can be: (1) utilized during boiler start up selectively to preheat the particulate removal system, the flue gas desulfurization system and/or intermediate ducting as shown and described with reference to FIG. 7; (2) during boiler operation for a coal drying facility 69, and subsequently vented to atmosphere, as shown and described with reference to FIG. 7; (3) released to atmosphere, as illustrated by atmospheric vent lines AV1 and AV2 in FIGS. 3 and 8, respectively; (4) to improve the heat rate of the steam generator system 10, as shown, for example, in FIGS. 12 and 13; (5) to evaporate water from an ash slurry discharged from a wet ash removal system in communication with a particulate removal system as in FIGS. 10 and 11, and/or the steam generator vessel 11; and (6) in a waste water system to reduce water discharge therefrom, as shown, for example, in FIGS. 10 and 11. Use of all or a portion of the first amount of heat to improve the heat rate of the steam generator system 10 includes: (1) utilizing at least a portion of the first amount of heat to improve steam cycle efficiency; (2) utilizing at least a portion of the first amount of heat to preheat feed water or condensate supplied to the steam generator system; and (3) utilizing at least a portion of the first amount of heat to reduce parasitic loads (e.g., space and potable water heating and steam for turbines for driving rotating equipment such as fans in lieu of electric driven motors, and other steam or heat loads other than for steam used for generating electricity) in the steam generator system.

Figure 2:
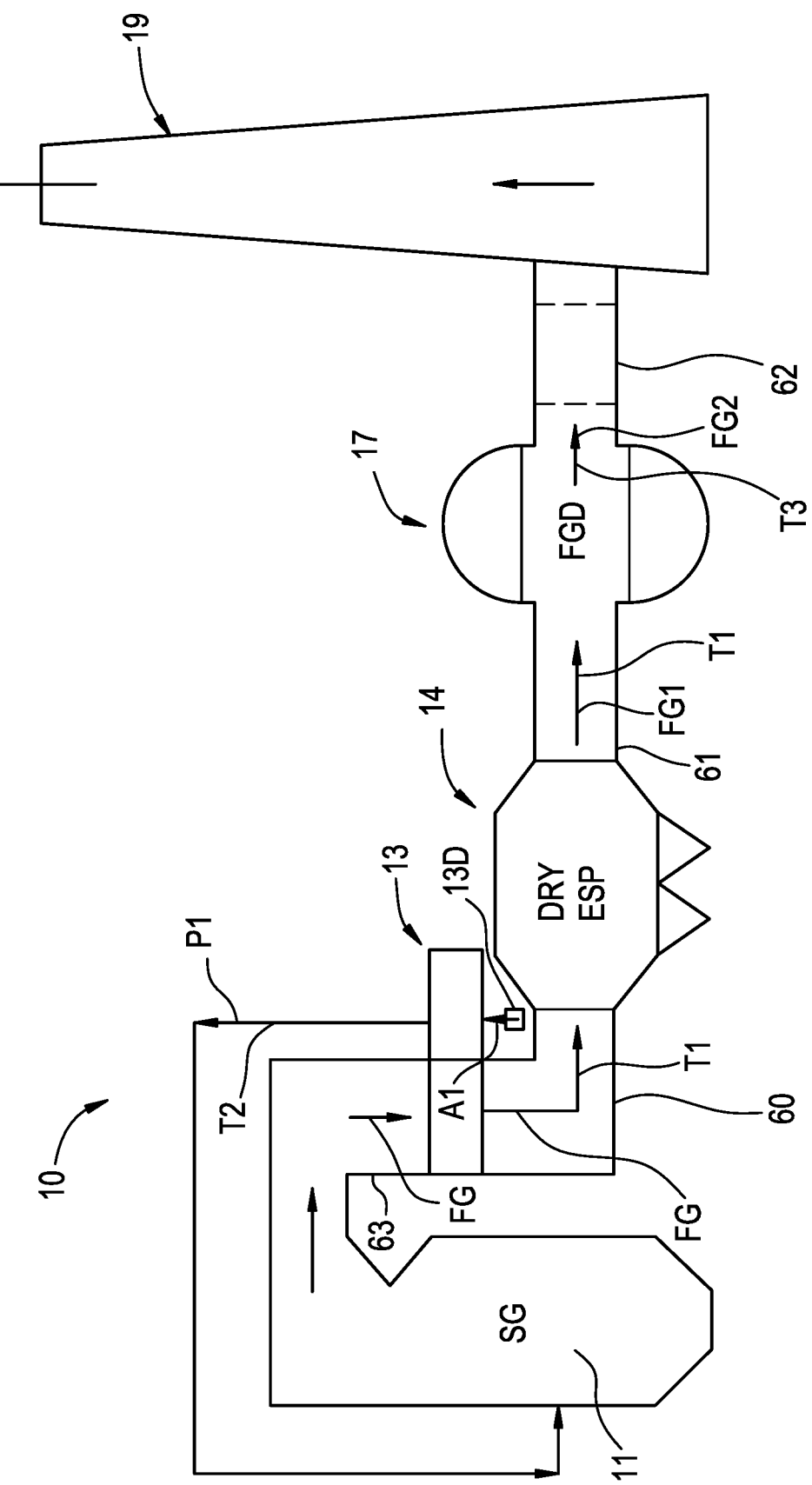
FIG. 2 is a schematic flow diagram of a steam generator system of the present invention.

As shown in FIG. 2, the steam generator system 10 also includes a particulate removal system 14, a flue gas desulfurization system 17 and a discharge stack 19. The steam generator vessel 11 is in communication with the discharge stack 19 through the air preheater 13, the particulate removal system 14 and the flue gas desulfurization system 17. The particulate removal system 14 is located directly downstream of the air preheater 13, such that there are no other substantive components such as fans or heat exchangers located between the air preheater 13 and the particulate removal system 14 which are in fluid communication with one another via a duct 60. In particular, there is no GGH 106X', similar to that shown in FIG. 2 of PCT Patent Application PCT/US2017/13459), located between the air preheater 13 and the particulate removal system 14. The flue gas desulfurization system 17 is located directly downstream of the particulate removal system 14, such that there are no other substantive components, such as heat exchangers, located between the particulate removal system 14 and the flue gas desulfurization system 17 which are in fluid communication with one another via a duct 61. In particular, there is no GGH 106X, similar to that shown in FIG. 1 of PCT Patent Application PCT/US2017/13459), located between the particulate removal system 14 and the flue gas desulfurization system 17. The discharge stack 19 is located directly downstream of the flue gas desulfurization system 17, such that there are no other substantive components such as fans or heat exchangers located between the flue gas desulfurization system 17 and the discharge stack 19 which are in fluid communication with one another via a duct 62. In particular, there is no GGH 106Y or 106Y', similar to that shown in FIGS. 1 and 2 of PCT Patent Application PCT/US2017/13459, located between the flue gas desulfurization system 17 and the discharge stack 19. There are no heat exchangers located between the air preheater 13 and the discharge stack 19. In one embodiment, as shown in FIG. 3, the duct 62 includes a reheat air injection device 21, such as a mixer, one or more turning vanes, a juncture and/or a turbulator device, disposed therein for mixing of a second portion P2 of the first amount A1 of air with a second treated flue gas mixture FG2, as described herein.

Figure 3:
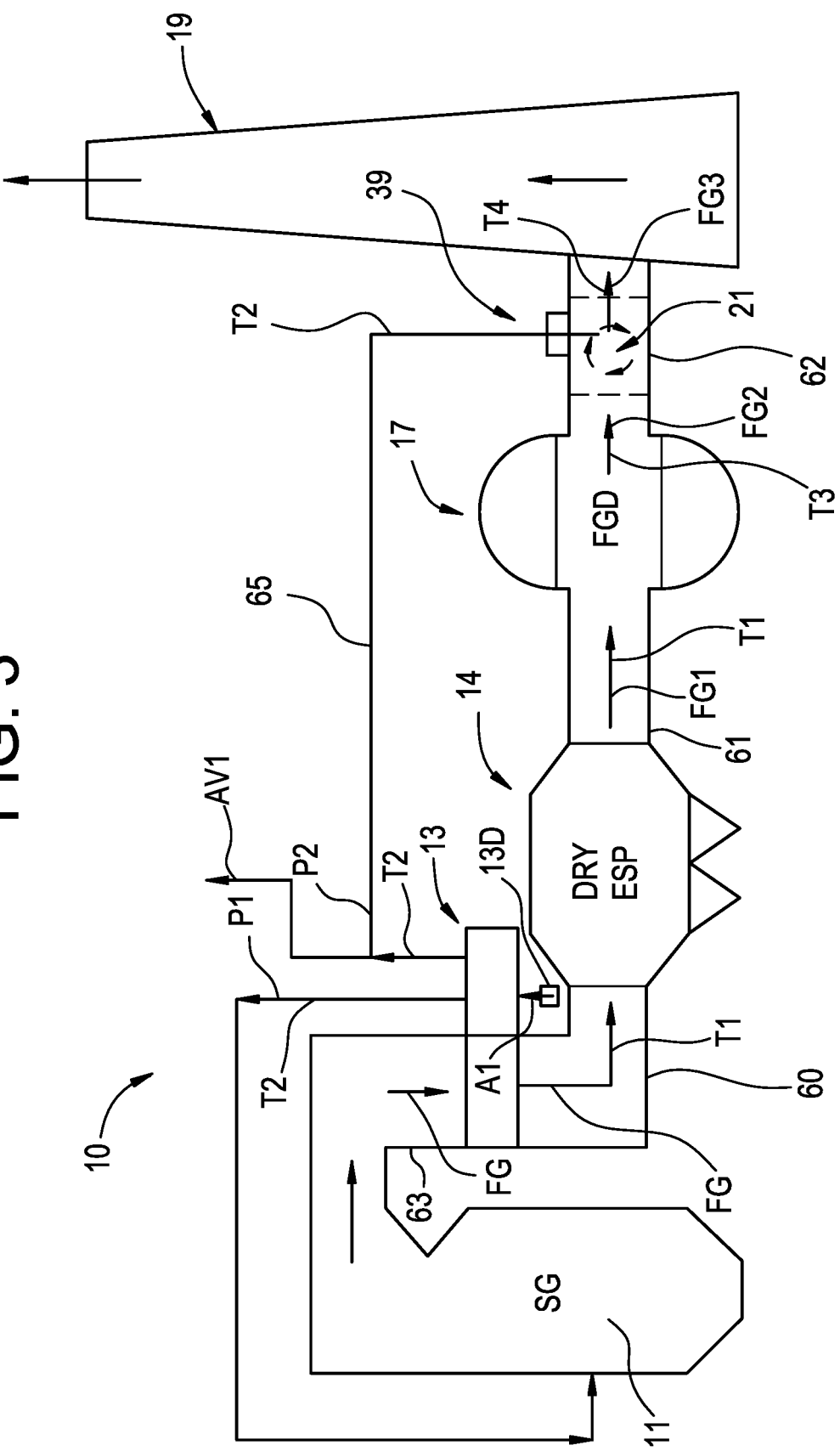
FIG. 3 is a schematic flow diagram of a steam generator system of the present invention.

As illustrated in FIG. 3, the air supply system 13D is configured to provide a first amount A1 of air to the air preheater 13. The first amount A1 of air is of a magnitude in excess of that required for combustion of fuel in the steam generator vessel 11 (e.g., the first amount of heat is of a magnitude in excess of that used to preheat the portion of the first amount of air provided to the steam generator vessel 11). In one embodiment, the first amount of heat is of a magnitude of about 10 to 25 percent of that used to preheat the combustion air. In one embodiment, the first amount of heat is of a magnitude determined based on excess capacity or design margin of the existing air supply system 13D (e.g., fan mass flow output margin), for example, first amount of heat is of a magnitude of about 10 to 15 percent of that used to preheat the combustion air. In a retrofit application, use of the existing air supply system 13D eliminates the need to replacement of costly fans and related systems. In one embodiment, the first amount of air is of a magnitude in excess of that required as combustion air. The air preheater 13 is configured to provide the first amount A1 of air at a mass flow sufficient to establish a first temperature T1 of a flue gas mixture FG exiting the air preheater 13. The first amount of air A1 is regulated by conventional means such as, but not limited to, variable speed fans and/or compressors, control valves and/or dampers. The first temperature T1 of a flue gas mixture FG exiting the air preheater 13 is cooler than the flue gas exiting the steam generator vessel 11 due to the air-to-gas leakage (e.g., leak due to ineffective, inefficient or damaged sector seals or other seals in the air preheater 13) that occurs at the cold end of the air preheater 13. The temperature of the flue gas exiting the steam generator vessel 11 is often referred to as the "uncorrected" gas outlet temperature, and the first temperature T1 of a flue gas mixture FG exiting the air preheater 13 after mixing with the cold air leakage is often referred to as the "corrected" gas temperature. The first temperature T1 is such that the air preheater 13 has a cold end metal temperature that is no less than (e.g., not substantially less than, approximately equal to or not substantially greater than) a water dew point temperature in the air preheater 13 and such that the cold end metal temperature is less than a sulfuric acid dew point temperature. The term "cold end metal" as used herein is the portion of the air preheater 13 that is at the lowest temperature therein. The first temperature T1 is from about 105° C. (220° F.) to about 125° C. (257° F.). (As used herein, the term "no less than a water dew point temperature" connotes a temperature that is approximately equal to the water dew point temperature such that there is no permanent wetting of the heat transfer elements in the air preheater that causes corrosion of fouling.

In another embodiment, the first temperature T1 is defined by the improved air preheater (e.g., AdvX™ air pre-heater, a trademark of ARVOS Ljungstrom LLC) operating with increased heat recovery HR as compared to a standard air preheater of at least 1% (one percent). This increased heat recovery HR expresses a percentage number calculated according to the equation HR=100%×((Tgi−TgoAdvX)/(Tgi−TgoSTD)−1). It will be appreciated that a negative number would represent decreased heat recovery. Here, the standard air preheater is defined as an air preheater where the first amount of air is of a magnitude equal to that required for combustion, i.e., it is combustion air and no excess air is preheated, and as having a rotor of equivalent diameter and depth of the improved air preheater.

In the equation HR=100%×((Tgi−TgoAdvX)/(Tgi−TgoSTD)−1): Tgi=Flue gas inlet temperature, i.e. of flue gas mixture entering the air preheater;

TgoAdvX=Flue gas outlet temperature, i.e. of flue gas mixture exiting the improved air preheater;

TgoSTD=Flue gas outlet temperature, i.e. of flue gas mixture exiting the standard air preheater.

For example, if Tgi=700 degrees Fahrenheit; TgoSTD=300 degrees Fahrenheit; and TgoAdvX=295 degrees Fahrenheit, then HR=100%×((700−295)/(700−300)−1)=1.25%.

In one embodiment, the air supply system 13D provides the first amount of air A1 to the air preheater 13 and the first amount of air A1 is regulated with conventional means (e.g., variable speed fans, blowers, compressors, dampers, valves, ducting arrangements, and combinations thereof). Thus the first amount of air A1 is regulated at a mass flow sufficient to establish a first temperature T1 of a flue gas mixture exiting the air preheater 13. In one embodiment, the magnitude of the mass flow of the first amount of air A1 is determined based upon the performance of the improved air preheater 13 and in particular the amount of heat recovery HR, which depends on the extent the improved seals and/or improved heat transfer sheets are employed. The first temperature T1 is such that the air preheater has a cold end outlet temperature defined by the improved air preheater operating with increased heat recovery (HR) of at least 1% as calculated according to the equation:

$$HR=100\% \times ((Tgi-TgoAdvX)/(Tgi-TgoSTD)-1).$$

In one embodiment, the air preheater has a cold end metal temperature that is no less than (e.g., a temperature that is approximately equal to the water dew point temperature such that there is no permanent wetting of the heat transfer elements in the air preheater that causes corrosion of fouling) to a water dew point temperature in the air preheater and such that the cold end metal temperature is less than a sulfuric acid dew point temperature and the first temperature being from about 105° C. (220° F.) to about 125° C. (257° F.).

In one embodiment, the increased heat recovery HR of the improved air preheater is achieved by employing heat transfer elements with improved heat transfer coefficients and increased heat transfer area, compared to prior art heat transfer elements. For example, the improved heat transfer elements described and/or embodied in Applicant Arvos Ljungstrom LLC's: (1) U.S. patent application Ser. No. 14/089,139, "Heat Transfer Elements for a Closed Channel Rotary Regenerative Air Preheater," filed Nov. 25, 2013; (2) International Application No. PCT/US2016/069186, "A Heat Transfer Sheet Assembly with an Intermediate Spacing Feature," filed Dec. 29, 2016; (3) International Application No. PCT/US2017/026840, "A Heat Transfer Sheet Assembly with an Intermediate Spacing Feature," filed Apr. 10, 2017; (4) U.S. patent application Ser. No. 14/877,451, "Alternating Notch Configuration for Spacing Heat Transfer Sheets," filed Oct. 7, 2015; (5) International Application No. PCT/US2016/056209 "Alternating Notch Configuration for Spacing Heat Transfer Sheets," Oct. 10, 2016; (6) Applicant's DN8™ brand heat transfer sheet; and/or (7) Applicant's TF4™ brand heat transfer sheet, are employed individually or in combinations thereof in improved air preheaters to achieve the increased heat recovery HR.

In one embodiment, the increased heat recovery HR of the improved air preheater is achieved by employing improved seals compared to prior art seals. For example, the improved seals described and/or embodied in Applicant Arvos Ljungstrom LLC's: (1) U.S. patent application Ser. No. 14/829, 210, "Flexible Seal for Rotary Regenerative Preheater," filed Aug. 18, 2015; (2) International Application No. PCT/US2016/056209, "Flexible Seal for Rotary Regenerative Preheater," filed Oct. 10, 2016; (3) International Application No. PCT/US2017/017414, "Flexible Seal for Rotary Regenerative Preheater," Feb. 10, 2017; (4) Applicant's Optiflex™ brand flexible seal; and/or (5) Applicant's Taperflex II™ brand seal, are employed individually or in combinations thereof in improved air preheaters to achieve the increased heat recovery HR.

In one embodiment, both the improved heat transfer sheets and the improved seals are employed in the improved air preheaters to achieve the increased heat recovery HR.

The foregoing equation (i.e., HR=100%×((Tgi−TgoAdvX)/(Tgi−TgoSTD)−1)) is employed to quantify the percentage improvement in heat recovery HR achieved by employing the foregoing improved heat transfer sheets and the improved seals in the improved air preheater 13, compared to prior art air preheaters.

Applicant discovered that mitigating $SO_3$ in the flue gas mixture before the flue gas mixture FG enters the air preheater 13, allows the improved air preheaters with the increased heat recovery HR to be employed, whereas with prior art steam generator systems, those skilled in the relevant art have not been able to realize the full potential of increased APH efficiency available through the use of higher efficiency heat transfer elements and greater heat transfer area of the heat transfer elements, because of operation limitations relating to the control of pollutants. However, those skilled in the art would understand how to install such improved heat transfer elements and improved seals in an improved air preheater to achieve the increased heat recovery HR.

The air preheater 13 is also configured to heat the first amount of air A1 to a second temperature T2 of about 288° C. to 399° C. (550° F. to 750° F.) for use in combustion of the fuel and for reheat air as described herein.

The steam generator system 10 includes one or more systems or devices for $SO_3$ mitigation upstream of the air preheater 13 which are configured to mitigate $SO_3$ in the flue gas mixture FG generated in the steam generator vessel 11. In one embodiment, one or more systems or devices for $SO_3$ mitigation upstream of the air preheater 13 includes supplying a low sulfur fuel to the steam generator vessel 11. The low sulfur fuel has a composition suitable for generating less than 5 parts per million $SO_3$. In one embodiment, the one or more systems or devices for $SO_3$ mitigation upstream of the air preheater 13 includes removing $SO_3$ in the flue gas mixture FG prior to admitting the flue gas mixture FG to the air preheater 13, for example in the duct 63. In one embodiment, the one or more systems or devices for $SO_3$ mitigation upstream of the air preheater 13 includes chemically rendering the $SO_3$ in the flue gas mixture into an inert salt, prior to admitting the flue gas mixture FG to the air preheater 13. In one embodiment, the chemically rendering includes either spraying an aqueous suspension of a reagent containing sodium, magnesium, potassium, ammonium and/or calcium thiosulfate and containing one or more soluble salt compounds such as thiosulfate and chloride species or containing at least one of sodium carbonate, sodium bicarbonate, sodium hydroxide, ammonium hydroxide, potassium hydroxide, potassium carbonate and potassium bicarbonate to create a particulate mist containing dry particles of at least one soluble salt compound that can react with the $SO_3$ in the flue gas.

As shown in FIG. 3, the particulate removal system 14 is configured to convey the flue gas mixture FG1 at the first temperature T1 directly to the flue gas desulfurization system 17, via the duct 61. As shown in FIG. 3, the particulate removal system 14 is configured to convey the flue gas mixture FG1 at the first temperature T1 directly to the flue gas desulfurization system 17, via the duct 61, so that T1 is in a range appropriate for efficient operation of system 17. As shown in FIG. 3, the particulate removal system 14 is configured to convey the flue gas mixture FG1 at the first temperature T1 to the flue gas desulfurization system 17, via the duct 61, so that T1 is in a range appropriate for efficient operation of system 17. In one embodiment, the particulate removal system 14 is a dry Electro Static Precipitator (ESP). Such a dry ESP includes rows of thin vertical wires (not shown) followed by a stack of large flat metal plates (not shown) oriented vertically. The flue gas FG flows horizontally through spaces between the wires, and then passes through the stack of plates. A negative voltage of several thousand volts is applied between wires and plates. If the applied voltage is high enough, an electric corona discharge ionizes the flue gas around the electrodes, which then ionizes the particles in the flue gas stream. The ionized particles, due to the electrostatic force, are diverted towards the grounded plates. Particles build up on the collection plates and are removed therefrom. Operating ESPs at the lower temperatures with flue gas compositions disclosed herein provides significant efficiency benefits that could enable a reduction in size of the ESP needed for use in various steam generator systems. While a dry ESP is shown and described, the present invention is not limited in this regard as wet ESP may be employed.

Figure 4:
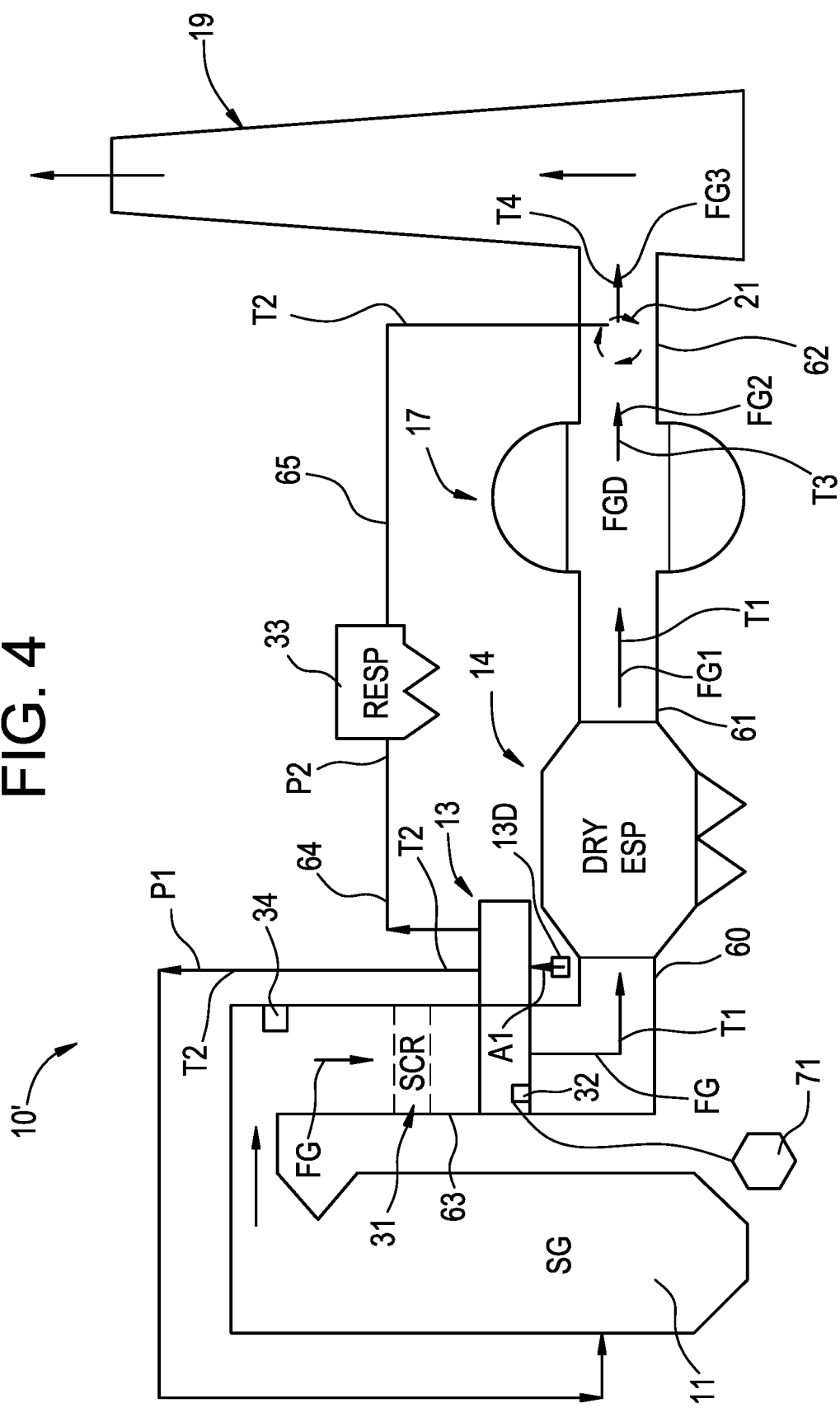
FIG. 4 is a schematic flow diagram of another embodiment of the steam generator system of the present invention.

As shown in FIG. 4, in one embodiment, the steam generator system 10' further comprises a flue gas reheat air particulate removal system 33 positioned in and between ducts 64 and 65. The air preheater 13 is in communication with the discharge stack 19 through the flue gas reheat air particulate removal system 33 to operatively remove, from the second portion P2 of air, particulate contaminants introduced from leakage within the air preheater 13 from the flue gas mixture FG. In one embodiment, the flue gas reheat air particulate removal system 33 is configured similar to the particulate removal system 14 as described herein. As illustrated in FIG. 4, there are no fans disposed between the flue gas reheat air particulate removal system 33 and the discharge stack 19.

As shown in FIG. 3, an excess air duct 65 is in communication with the air preheater 13 and the duct 62 positioned between the flue gas desulfurization system 17 and the discharge stack 19. The excess air duct 65 is configured to convey the second portion P2 of the first amount A1 of air as flue gas reheat air P2 fed from the air preheater 13 at the second temperature T2 from the air preheater 13 to the second duct 62. For example, the excess air duct 65 is covered with a thermal insulation (not shown) in order to minimize heat loss from the excess air duct 65. In addition, the excess air duct 65 is configured with a suitable cross sectional flow area, smooth internal surfaces and a minimal number of bends to minimize pressure loss through the excess air duct 65.

As shown in FIG. 3, a reheat air injection device 21 is located between the flue gas desulfurization system 17 and the discharge stack 19. The reheat air injection device 21 is configured to discharge the flue gas into the discharge stack 19 at a fourth temperature T4 of at least 68° C. (155° F.), typically raising the flue gas temperature by at least about 5° F. In one embodiment, the reheat air injection device 21 includes a mixer, one or more turning vanes, a juncture and/or a turbulator device disposed therein for mixing of the second portion P2 (i.e., the flue gas reheat air P2) of the first amount A1 of air with the second treated flue gas mixture FG2. In another embodiment, the reheat air injection device 21 is configured to inhibit corrosion during start-up or otherwise maintain operational fluid dynamic stability at the flue gas ingress to the stack 19 and/or to reduce the potential for visible plume being discharged from the stack. In one embodiment, the reheat air injection device is part of a manifold 39 that connects the flue gas desulfurization system 17, the excess air duct 65 and the discharge stack 19.

The manifold includes a branch connection to which the excess air duct 65 is connected. In another embodiment, the reheat air indirectly reheats the mixture FG2 suitably by means of heat exchange tubing or ducting across which the flue gas is made to flow adjacent the discharge stack 19.

As shown in FIG. 4, in one embodiment, the steam generator system 10' includes a selective catalytic reduction system (SCR) 31 for converting nitrogen oxides, also referred to as $NO_X$, with the aid of a catalyst into diatomic nitrogen ($N_2$) and water ($H_2O$). The steam generator vessel 11 is in communication with the air preheater 13 through the SCR 31.

As shown in FIG. 4, in one embodiment, the steam generator system 10' includes a humidity sensor 34 disposed in an outlet of the steam generator vessel 11 and upstream of the air preheater 13 to measure humidity of the flue gas mixture FG. The humidity sensor 43 is configured to determine the magnitude of first temperature T1.

As shown in FIG. 4, in one embodiment, the steam generator system 10' includes an infrared sensor 32 to determine the temperature of the air preheater 13. The infrared sensor 32 is configured to determine the temperature of the air preheater for example, the cold end metal temperature, by measuring the temperature of a portion of the air preheater 13 that is in thermal communication with or proximate to the cold end. The steam generator system 10' includes a control unit 71, such as a computer processor, memory and signal processing electronics configured to control the cold end metal temperature above the water dew point in the air preheater 13.

Figure 7:
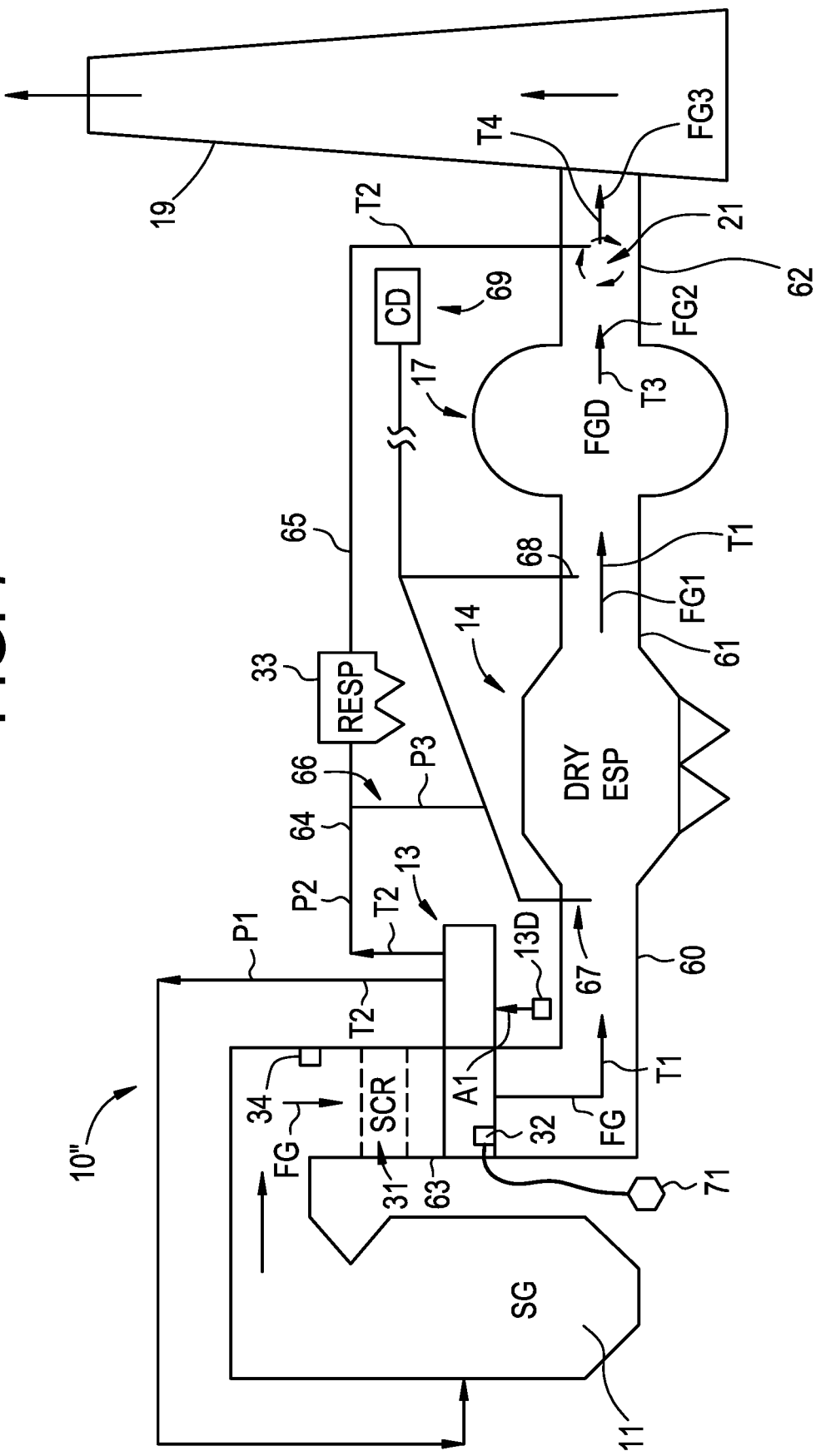
FIG. 7 is a schematic flow diagram of a further embodiment of the steam generator system of the present invention.

As shown in FIG. 7, in another embodiment, in steam generator system 10" the excess air duct 65 is provided with an excess air bleed 66 to convey a third portion P3 of the first amount A1 of air as preheat air P3 usable, for example, during start-up to preheat equipment and ducting downstream of the air preheater 13. Dampers (not shown) are provided selectively to feed preheat injection sites 67, 68 respectively upstream of the ESP 14 and FGD 17 to introduce preheat air P3 into the flue gas mixtures FG and FG1. Additionally, preheat air P3 may be fed to a remote coal dryer 69 (CD), which is particularly useful when utilizing wet coals like lignite, for example. The preheat required for coal drying would typically be required for coal firing and would not necessarily be needed during start-up firing with oil or natural gas for example. The lower outlet temperatures provided by air preheater 13 is advantageous when drying coal as the intent is to remove moisture and not elevate coal temperature excessively (as such elevation might increase the likelihood of pre-ignition within grinding mills, for example). It will be understood that the air bleed 66 may be used selectively during operation for equipment/ducting preheat and/or coal drying and is particularly useful during start-up to inhibit condensation within the equipment and ducting. It will be appreciated in other embodiments the preheat air would be required only upstream of the ESP 14 or FGD 17 and not upstream of both as illustrated in FIG. 7.

The present invention includes a method for improving effectiveness of a steam generator system 10. The method includes providing a steam generator system 10 as described in detail herein and including the steam generator vessel 11, the air supply system 13D, the air preheater 13, the particulate removal system 14, the flue gas desulfurization system 17, and the flue gas discharge stack 19. The air supply system 13D is in communication with the steam generator vessel 11 through the air preheater 13, and with the steam generator vessel 11 being in communication with the discharge stack 19 through the air preheater 13, the particulate removal system 14 and the flue gas desulfurization system 17. The particulate removal system 14 is located downstream of the air preheater 13. The flue gas desulfurization system 17 is located downstream of the particulate removal system 14. The discharge stack 19 is located downstream of the flue gas desulfurization system 17.

The method includes having the air supply system 13D provide the first amount A1 of air to the air preheater 13. The first amount A1 of air is of a magnitude in excess of that required for combustion of fuel in the steam generator vessel 11. The air preheater 13 provides the first amount A1 of air at a mass flow sufficient to establish a first temperature T1 of a flue gas mixture FG exiting the air preheater 13. The first temperature T1 is such that the air preheater has a cold end metal temperature that is no less than a water dew point temperature in the air preheater 13 and such that the cold end metal temperature is less than a sulfuric acid dew point temperature. The first temperature T1 being from about 105° C. (220° F.) to about 125° C. (257° F.).

The method includes mitigating $SO_3$ in the flue gas mixture FG generated in the steam generator vessel 11, before the flue gas mixture FG enters the air preheater 13. The method includes configuring the air preheater 13 to heat the first amount of air A1 to a second temperature T2 of about 288° C. to 399° C. (550° F. to 750° F.) and supplying a first portion P1 of the first amount A1 of air as combustion air to the steam generator vessel 11 for combustion of the fuel. The method includes discharging the flue gas mixture FG at the first temperature T1, directly from the air preheater 13 to the particulate removal system 14 thereby removing particulate from the flue gas mixture FG and creating a first treated flue gas mixture FG1. The method further includes discharging the first treated flue gas mixture FG1 from the particulate removal system 14 directly into the flue gas desulfurization system 17 thereby creating in and discharging from the flue gas desulfurization system 17, a second treated flue gas mixture FG2 at a third temperature T3 of 52° C. to 60° C. (125° F. to 140° F.) The method also includes injecting a second portion P2 of the first amount A1 of air as flue gas reheat air fed from the air preheater 13 at the second temperature T2 with the second flue treated flue gas mixture FG2 at the third temperature T3 thereby creating a third treated flue gas mixture FG3 at a fourth temperature T4 of at least 68° C. (155° F.), prior to entering the discharge stack 19. The third treated flue gas mixture FG3 is admitted to the discharge stack 19 at the fourth temperature T4.

In one embodiment, the steam generator system 10 further includes an SCR 31 as shown in FIG. 4 for converting nitrogen oxides, also referred to as $NO_X$, with the aid of a catalyst into diatomic nitrogen ($N_2$) and water ($H_2O$). The steam generator vessel 11 is in communication with the air preheater 13 through the SCR 31.

As shown in FIG. 4, in one embodiment, the steam generator system 10' includes a flue gas reheat air particulate removal system 33. The air preheater 13 is in communication with the discharge stack 19 through the flue gas reheat air particulate removal system 33. In one embodiment, the method includes removing particulate contaminants from the second portion P2 of air. The particulate contaminants are introduced to the second portion P2 of air from leakage within the air preheater 13 from the flue gas mixture FG1.

As shown in FIG. 4, in one embodiment, the steam generator system 10' includes a humidity sensor 34 disposed between the steam generator vessel 11 and the air preheater 13. In one embodiment, the method includes measuring, with the humidity sensor 34, humidity of the flue gas mixture FG to determine a magnitude of first temperature T1.

As shown in FIG. 4, in one embodiment, the steam generator system 10' includes an infrared sensor 32. In one embodiment, the method includes determining, with the infrared sensor, the cold end metal temperature in the air preheater 13. The infrared sensor 32 determines the air preheater temperature for example, the cold end metal temperature, by measuring the temperature of a portion of the air preheater 13 that is in thermal communication with or proximate to the cold end. The steam generator system 10' includes a control unit 71, such as a computer processor, memory and signal processing electronics and the method includes comparing the cold end metal temperature to the water dew point temperature and controlling, with the control unit, the cold end metal temperature above the water dew point in the air preheater 13.

In one embodiment, the method includes mitigating $SO_3$ in the flue gas mixture FG by supplying a low sulfur fuel to the steam generator vessel 11. The low sulfur fuel being of a composition to generate less than 5 parts per million $SO_3$.

In one embodiment, the method includes mitigating $SO_3$ in the flue gas mixture FG by removing $SO_3$ in the flue gas mixture FG prior to admitting the flue gas mixture FG to the air preheater 13.

In one embodiment, the method includes mitigating $SO_3$ in the flue gas mixture FG by chemically rendering the $SO_3$ in the flue gas mixture into an inert salt, prior to admitting the flue gas mixture FG to the air preheater 13. In one embodiment, the chemically rendering step includes spraying an aqueous suspension of a reagent either containing at least one of sodium, magnesium, potassium, ammonium and calcium thiosulfate and containing at least one soluble salt compound chosen from the group consisting of thiosulfate and chloride species or containing at least one of sodium carbonate, sodium bicarbonate, sodium hydroxide, ammonium hydroxide, potassium hydroxide, potassium carbonate and potassium bicarbonate to create a particulate mist containing dry particles of at least one soluble salt compound that can react with the $SO_3$ in the flue gas.

In one embodiment, the method includes providing an injection device 21 between the flue gas desulfurization system 17 and the discharge stack 19 and wherein the injecting of the second portion P2 of the first amount A1 of air, at the second temperature T2, with the second flue treated flue gas mixture FG2 at the third temperature T3 occurs in the injection device 21.

In one embodiment, the method includes discharging the flue gas mixture FG at the first temperature T1, directly from the air preheater 13 to the particulate removal system 14 with no heat exchangers disposed between the air preheater 13 and the particulate removal system 14.

In one embodiment, the method includes discharging the first treated flue gas mixture FG1 from the particulate removal system 14 directly into the flue gas desulfurization system 17, with no heat exchangers disposed between the particulate removal system 14 and the flue gas desulfurization system 17.

In one embodiment, the method includes injection of the second portion P2 of the first amount A1 of air at a mass ratio of the second portion P2 to the second treated flue gas mixture FG2 of 1 percent to 16 percent. In one embodiment, the method includes injection of the second portion P2 of the first amount A1 of air at a mass ratio of the second portion P2 to the second treated flue gas mixture FG2 of 9 percent to 16 percent.

The present invention includes a method for retrofitting a steam generator system 100, 100' for improved effectiveness. The method for retrofitting includes removing one or more heat exchangers positioned downstream of the air preheater 13. The method for retrofitting includes reconfiguring an air supply source 13D to the air preheater 13 to supply a first amount A1 of air in excess of that required for combustion of fuel in the steam generator vessel 11 and reconfiguring at least one of the air supply source 13D and the air preheater 13 such that the first amount A1 of air is provided at a mass flow sufficient to establish a first temperature T1 of a flue gas mixture FG exiting the air preheater 13, the first temperature T1 being such that the air preheater has a cold end metal temperature that is no less than a water dew point temperature in the air preheater 13 and such that the cold end metal temperature is less than a sulfuric acid dew point temperature, and the first temperature T1 being from about 105° C. (220° F.) to about 125° C. (257° F.).

In another embodiment, the first temperature T1 is defined by the improved air preheater (e.g., AdvX™ air preheater) operating with increased efficiency as compared to a standard air preheater of at least 1% (one percent) as defined herein. The reconfiguring of the air supply 13D includes but is not limited to employing a higher flow and/or pressure capacity fan or blower and/or reducing the pressure drop in the air supply system, compared to that employed in the prior art air supply 103D, 103D' as shown in FIGS. 1 and 2 of PCT Patent Application PCT/US2017/13459, respectively.

The method for retrofitting includes providing one or more $SO_3$ mitigation systems in communication with the steam generator vessel 11. The $SO_3$ mitigation systems are configured to mitigate the $SO_3$ in the flue gas mixture generated in the steam generator vessel 11. In one embodiment, the mitigating of $SO_3$ occurs before the flue gas mixture FG enters the air preheater 13. The method for retrofitting includes configuring the air preheater 13 to heat the first amount of air A1 to a second temperature T2. The second temperature is substantially no less than the temperature of combustion air of an original system (e.g., a prior art steam generator system 100, 100' of FIGS. 1 and 2 of PCT Patent Application PCT/US2017/13459), respectively). In one embodiment, the second temperature is about 288° C. to 399° C. (550° F. to 750° F.) to maintain or improve boiler thermal efficiency. The method for retrofitting includes supplying a first portion P1 of the first amount A1 of air to the steam generator vessel 11 for combustion of the fuel. The method for retrofitting includes discharging the flue gas mixture FG at the first temperature T1, directly from the air preheater 13 to the particulate collection system 14 thereby removing particulate from the flue gas mixture FG and creating a first treated flue gas mixture FG1. The first treated flue gas mixture FG1 is discharged from the particulate removal system 14 directly into the flue gas desulfurization system 17 (i.e., without flowing through a heat exchanger such as the GGH 106Y, 106Y' of the prior art heat exchanger systems of FIGS. 1 and 2 of PCT Patent Application PCT/US2017/13459), respectively). However, in one retrofitting embodiment, the first treated flue gas mixture FG1 is discharged from the particulate removal system 14 directly into the flue gas desulfurization system 17 by flowing through one or more existing heat exchangers such as the GGH 106Y, 106Y' of the prior art heat exchanger systems of FIGS. 1 and 2 of PCT Patent Application PCT/US2017/13459, respectively. In such a retrofitting embodiment, the existing heat exchangers may be fully operation or downgraded in performance or made non-functional for heat exchanging. The method for retrofitting includes creating in and discharging from the flue gas desulfurization system 17, a second treated flue gas mixture FG2 at a third temperature T3 of 52° C. to 60° C. (125° F. to 140° F.).

The method for retrofitting includes injecting a second portion P2 of the first amount A1 of air as flue gas reheat air fed from the air preheater 13 at the second temperature T2 with the second flue treated flue gas mixture FG2 at the third temperature T3 thereby creating third treated flue gas mixture FG3 at a fourth temperature T4 of 68° C. (155° F.), prior to entering the discharge stack 19; and admitting the third treated flue gas mixture FG3 to the discharge stack 19 at the fourth temperature T4.

In one embodiment, the method for retrofitting includes replacing at least a portion of an outlet duct connecting the flue gas desulfurization system 17 and the discharge stack 19 with a manifold 39 that connects the flue gas desulfurization system 17, an excess air duct 65 and the discharge stack 19.

In one embodiment, the method for retrofitting includes providing a flue gas reheat air particulate removal system 33, such that the air preheater 13 is in communication with the discharge stack 19 through the flue gas reheat air particulate removal system 33. Particulate contaminants are removed from the second portion P2 of air, the particulate contaminants being introduced to the second portion P2 of air from leakage within the air preheater 13 from the flue gas mixture FG.

In one embodiment, the method for retrofitting includes a humidity sensor 34 disposed in the communication between the steam generator vessel 11 and the air preheater 13. The first humidity sensor 34 measures the humidity of the flue gas mixture FG to determine a magnitude of first temperature T1.

In one embodiment, the method for retrofitting includes providing an infrared sensor 32; and determining, with the infrared sensor, the cold end metal temperature in the air preheater 13, comparing the cold end metal temperature to the water dew point temperature; and controlling the cold end metal temperature to be no less than the water dew point temperature, with the control unit 71 as described herein.

After implementing the retrofit method, the steam generator system 10, 10', 10" has a second thermal efficiency that is least as great as a first thermal efficiency of the prior art steam generator system (e.g., the steam generator system 100, 100' of FIGS. 1 and 2 of PCT Patent Application PCT/US2017/13459, respectively) before implementing the retrofit method. In one such embodiment, the original steam generator system operates with a wet stack limited to flue gas outlet velocities in the order of 55 to 60 feet per second thereby preventing pollutant mist exiting the discharge stack 19. Such a wet stack is equipped with condensate collection means which drain into a water treatment facility that removes pollutants prior to drainage from the facility. By utilizing this invention the retrofitted facility operates with a dry stack that typically can operate with flue gas outlet velocities up to around 100 feet per second. Flue gas velocity is a function of load, i.e. in low load conditions it is low and maximum operational load may be limited by the maximum sustainable flue gas velocity. It will be appreciated therefore that once retrofitted, the steam generator system 10, 10', 10" can operate at higher loads than previously possible resulting in increased steam generation and power output from the steam generator vessel 11. Even when operated at no greater load than before, the absence of a wet stack results in decreased water usage together with cost savings associated with no longer needing to operate any water treatment of condensate hitherto collected from the discharge stack 19. The present invention also includes another method for improving effectiveness of a steam generator system 10. The method includes providing a steam generator system 10 that includes the steam generator vessel 11, the air supply system 13D, the air preheater 13, the first particulate removal system 14, the second particulate removal system 33, the flue gas desulfurization system 17, and the flue gas discharge stack 19. The steam generator system 10 has the air supply system 13D in communication with the steam generator vessel 11 through the air preheater 13. The steam generator vessel 11 is in communication with the discharge stack 19 through the air preheater 13, the first particulate removal system 14 and the flue gas desulfurization system 17, with the first particulate removal system 14 being located downstream of the air preheater 13, with the flue gas desulfurization system 17 being located downstream of the first particulate removal system 14; with the discharge stack 19 being located downstream of the flue gas desulfurization system 17 and with the air preheater 13 being in communication with the discharge stack 19 through the second particulate removal system 33. The method includes providing a humidity sensor 34 disposed between the steam generator vessel 11 and the air preheater 13, and providing an infrared sensor 32 proximate or in the air preheater 13. The method includes measuring humidity of a flue gas mixture FG with the humidity sensor to determine a magnitude of a first temperature T1.

The method includes providing, via the air supply system 13D, a first amount A1 of air to the air preheater 13, the first amount A1 of air being of a magnitude in excess of that required for combustion of fuel in the steam generator vessel 11, and the air preheater 13 providing the first amount A1 of air at a mass flow sufficient to establish a first temperature T1 of a flue gas mixture FG exiting the air preheater 13, the first temperature T1 being such that the air preheater has a cold end metal temperature that is no less than a water dew point temperature in the air preheater 13 and such that the cold end metal temperature is less than a sulfuric acid dew point temperature and the first temperature T1 being from about 105° C. (220° F.) to about 125° C. (257° F.).

The method includes determining, with the infrared sensor 32, the cold end metal temperature in the air preheater 13, comparing the cold end metal temperature to the water dew point temperature; and controlling the cold end metal temperature to be no less than the water dew point temperature, using the control unit 71, as described herein.

The method includes mitigating $SO_3$ in the flue gas mixture generated in the steam generator vessel 11. The mitigating of $SO_3$ occurs before the flue gas mixture FG enters the air preheater 13. The air preheater 13 is configured to heat the first amount of air A1 to a second temperature T2 of about 288° C. to 399° C. (550° F. to 750° F.). A first portion P1 of the first amount A1 of air is supplied as combustion air to the steam generator vessel 11 for combustion of the fuel.

The method includes discharging the flue gas mixture FG at the first temperature T1, directly from the air preheater 13 to the particulate removal system 14 thereby removing particulate from the flue gas mixture FG and creating a first treated flue gas mixture FG1. The first treated flue gas mixture FG1 is discharged from the particulate removal system 14 directly into the flue gas desulfurization system 17 thereby creating in and discharging from the flue gas desulfurization system 17, a second treated flue gas mixture FG2 at a third temperature T3 of 52° C. to 60° C. (125° F. to 140° F.).

The method includes removing particulate contaminants from the second portion P2 of air. The particulate contaminants being introduced to the second portion P2 of air from leakage within the air preheater 13 from the flue gas mixture FG. A second portion P2 of the first amount A1 of air is injected as flue gas reheat air fed from the air preheater 13 at the second temperature T2 with the second flue treated flue gas mixture FG2 at the third temperature T3 thereby creating third treated flue gas mixture FG3 at a fourth temperature T4 of at least 68° C. (155° F.), prior to entering the discharge stack 19. The third treated flue gas mixture FG3 is admitted to the discharge stack 19 at the fourth temperature T4.

Figure 5:
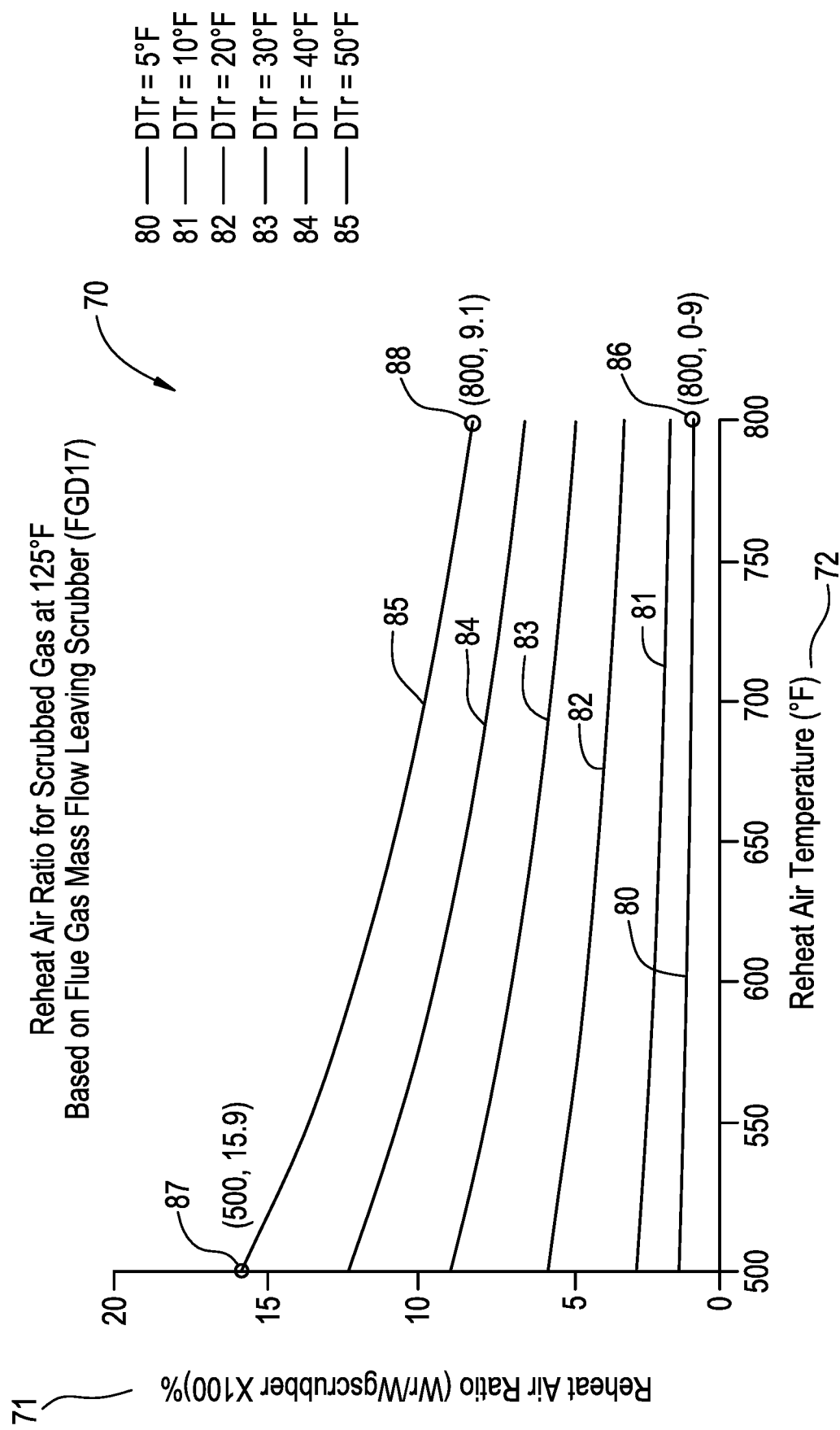
FIG. 5 is a graph of reheat air ratio to scrubbed gas for various flue gas temperature increases.

As shown in FIG. 5, a graph generally designated by the numeral 70 has the flue gas reheat air P2 temperature in degrees Fahrenheit designated on an X-axis 72 and reheat air ratio RR in percentage equal to the mass flow rate WR of flue gas reheat air P2 (i.e., the second portion P2 of the first amount A1 of air) divided by 100 times the mass flow rate WG of scrubbed gas FG2 leaving the FGD system 17 (FIGS. 3 and 4) at 125° F., on a Y-axis 71. The graph 70 includes plots for six different increases in temperature DTr of the flue gas FG2 exiting the FGD 17 (FIGS. 3 and 4). Specifically, the graph includes a plot 80 for DTr of 5° F., a plot 81 for DTr of 10° F., a plot 82 for DTr of 20° F., a plot 83 for DTr of 30° F.; a plot 84 for DTr of 40° F. and a plot 85 for DTr of 50° F., illustrating the reheat air ratio RR as a function of temperature of the reheat air P2. For example, reheat ratio RR ranges from about 1 percent at point 86 (i.e., 800° F., 0.9% for the DTr of 5° F. of the plot 80) to about 16 percent at point 87 (i.e., 500° F., 15.9% at 500° F. for the DTr of 50° F. of the plot 85). For the plot 85 for the 50° F. DTr, the RR ranges from about 9 percent at point 88 (i.e., 800° F., 9.1% for the DTr of 50° F. of the plot 85) to about 16 percent at point 87 (i.e., 500° F., 15.9% at 500° F. for the DTr of 50° F. of the plot 85). While the ranges of reheat ratio RR of 1 percent to 16 percent and 9 percent to 16 percent are shown and described, other ranges of the reheat ratio RR may be employed, depending on the DTr and the temperature of the reheat air P2. The inventors arrived at the data points and plots 80-85 of FIG. 5 as a result of significant analysis and testing, thereby discovering the surprising results graphically illustrated on the graph 70 of FIG. 5.

Figure 6:
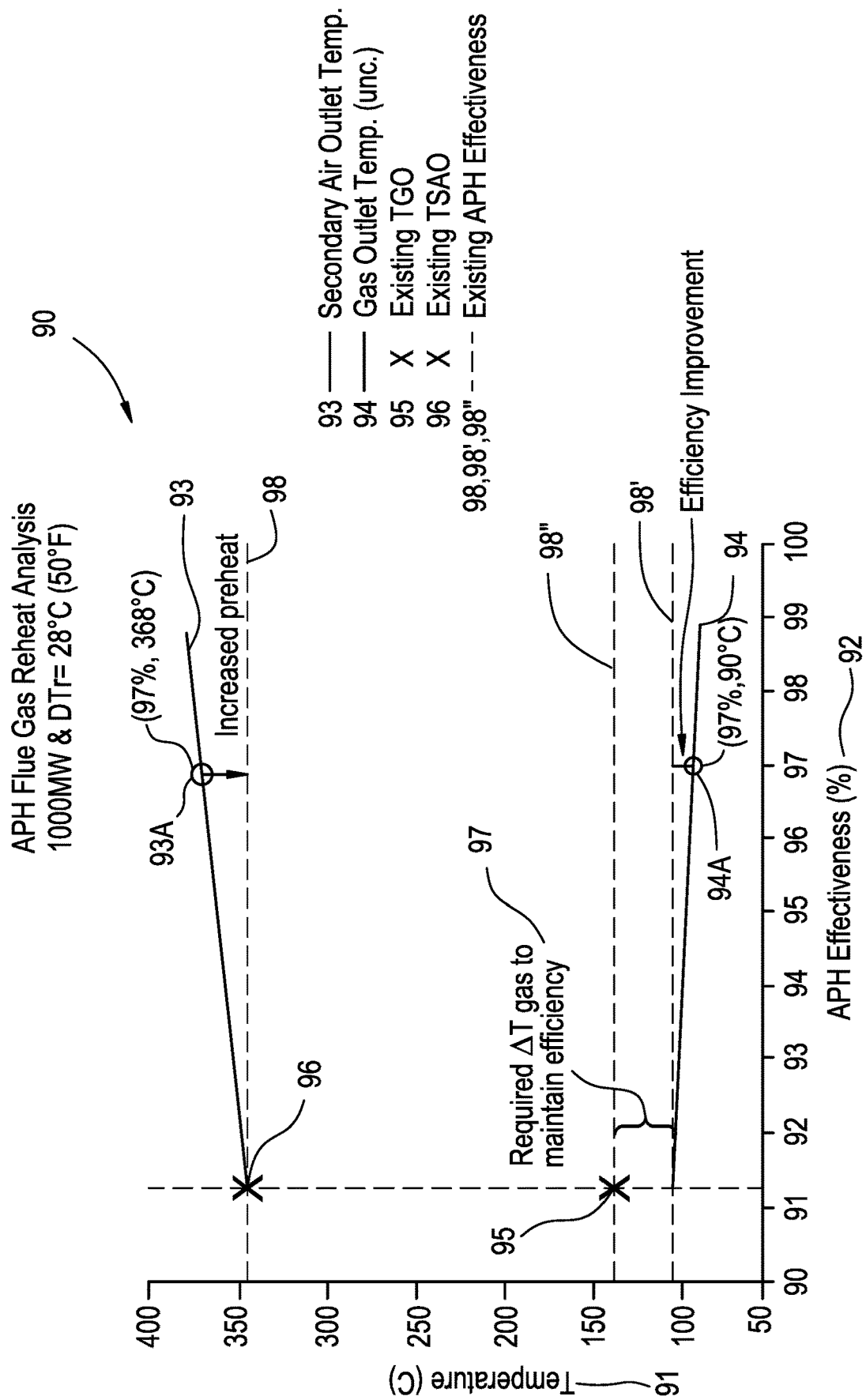
FIG. 6 is a graph of air preheater efficiency improvements.

As shown in FIG. 6, a graph 90 has air preheater 13 effectiveness in percentage shown on an X-axis 92 and temperature in degrees Celsius shown on a Y-axis 91 for a 1000 MW steam generator system 10, 10' with a 28° C. (50° F.) temperature rise of the flue gas FG2 exiting the FGD 17 as a result of the injection of the flue gas reheat air P2 into the duct 62 between the FGD 17 and the discharge stack 19. The graph 90 includes a plot 93 of air preheater 13 effectiveness in terms of secondary air P1, P2 temperature T2 (FIGS. 3 and 4). The graph 90 includes a plot 94 of air preheater 13 effectiveness in terms of flue gas FG outlet temperature T1 (FIGS. 3 and 4). The inventors have discovered that to maintain the thermal efficiency of the steam generator system 10, 10' a differential temperature DT of 35° C. between the 150° C. flue gas FG outlet temperature of the prior art steam generator system 100, 100' shown in PCT Patent Application PCT/US2017/13459) (illustrated by dotted line 98" in the graph 90) and the flue gas FG outlet temperature T1 (FIGS. 3 and 4) of about 105° C. (illustrated by dotted line 98' in the graph 90) is required. As the differential temperature DT of the flue gas outlet temperature increases, thermal efficiency improvements of the steam generator system 10, 10' are realized. For example, as shown in the graph 90, a thermal efficiency increase is realized at point 94A of the line 94 at which the flue gas outlet temperature T1 is 90° C. and the air preheater effectiveness is 97 percent. The increased thermal efficiency and air preheater effectiveness is a result of the first amount of air A1 being greater than that supplied through prior art air preheaters and/or increased efficiency or increased area of heat transfer elements in the air preheater 13 compared to the heat transfer elements employed in prior art air preheaters. As shown in the graph 90 effectiveness of the air preheater 13 and increased thermal efficiency of the steam generator system 10, 10', compared to prior art steam generator systems 100, 100' of PCT Patent Application PCT/US2017/13459, is also realized through an increase in the temperature of the first portion P1 of the first amount A1 of air supplied to the steam generator vessel 11 for combustion of the fuel. The graph 90 includes a plot 93 illustrating an increase in effectiveness of the air preheater 13 as a function of temperature of the first portion P1 of the first amount A1. For example, at point 93A in which the temperature of the first portion P1 of the first amount A1 is 368° C. and the air preheater 13 effectiveness is at 97 percent, an increase in thermal efficiency of the steam generator system 10, 10' is realized, compared to the prior art steam generator systems 100, 100' of PCT Patent Application PCT/US2017/13459.

Figure 8:
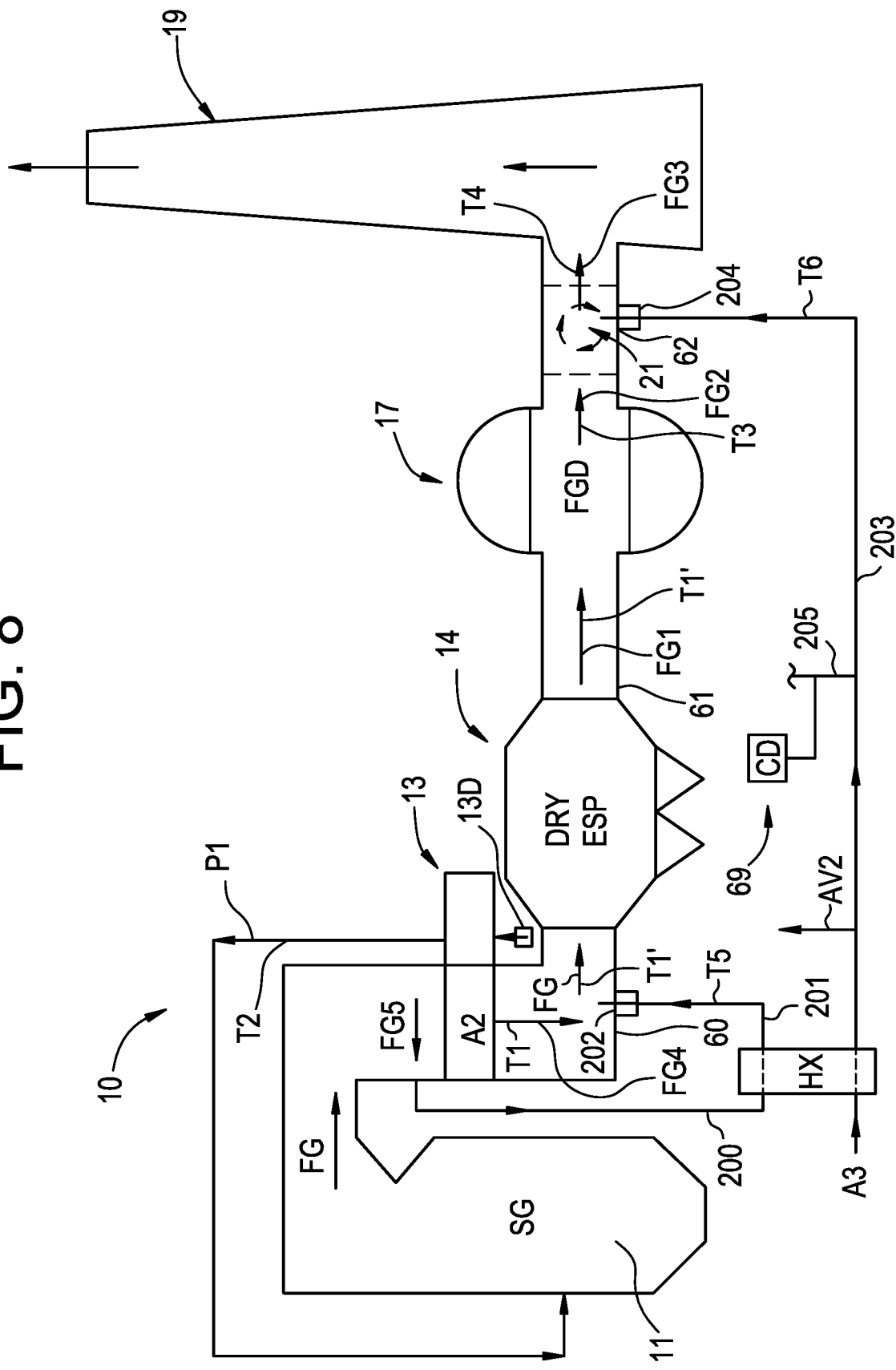
FIG. 8 is a schematic flow diagram of a yet further embodiment of the steam generator of the present invention.

In the embodiment illustrated in FIG. 8 to achieve the low temperature operation of the air preheater 13 the amount of flue gas fed to the air preheater 13 has been reduced rather than using excess air as in previous embodiments. This is facilitated upstream of the air preheater 13 by providing a bleed duct 200 so that the flue gas FG exiting the steam generator vessel 11 is divided into two streams FG4 and FG5. The first stream FG4 is fed to and discharged from the air preheater 13 and the second stream FG5 is bled into the duct 200. The volume of the second stream FG5 may be controlled by valve means (not shown) to achieve the desired first temperature T1 of the flue gas mixture FG4 exiting the air preheater 13. This second stream FG5 is suitably cooled in a heat exchanger HX to a temperature T5 and then fed through ducting 201 into a manifold 202 so as to recombine with the first stream FG4 to recreate the flue gas stream FG that then enters the ESP 14 at a temperature T1'. In one embodiment, the temperature T1 referred to in the embodiments of FIGS. 3, 4 and 7 and the temperature T1' referred to in the embodiment of FIG. 8, are identical or near identical. In the embodiment shown in FIG. 8 the amount of air A2 that passes through the air preheater 13 is that volume P1 which is required for combustion, i.e. unlike the first amount A1 required of the embodiments illustrated in FIGS. 3, 4 and 7 there is no excess air portion P2 produced.

In the embodiment illustrated in FIG. 8 instead of using excess air P2 for flue gas reheat, an air stream A3 enters and is heated in the heat exchanger HX by the second flue gas stream FG5. The airstream A3 exits the heat exchanger HX and is fed through ducting 203 at a temperature T6 to a manifold 204 through which it is injected as flue gas reheat air to effect stack reheat as described in the embodiments illustrated in FIGS. 3, 4 and 7. In one embodiment, the temperature T6 illustrated in FIG. 8 and the temperature T2 referred to in the embodiments of FIGS. 3, 4 and 7, are identical or nearly identical. In one embodiment, the heat exchanger HX is configured to have the second flue gas stream FG5 pass over tubing directly through which the air stream A3 flows (e.g. a direct heat exchanger). In one embodiment, the heat exchanger Hx is configured to have the air stream A3 pass over tubing directly through which the flue gas stream FG5 flows (e.g., a direct heat exchanger). In one embodiment, the heat exchanger HX is configured in known manner with a fluid heat exchange medium conducting heat from the flue gas stream FG5 to the air stream A2 (i.e. indirect heat exchanger).

As shown in FIG. 8, an optional air bleed 205 can be employed so that some or all of the air stream A3 may be used similarly to the third portion P3 of excess preheat air as described with reference to the embodiments illustrated in FIGS. 3, 4 and 7, for example. The air bleed 205 can avoid using the air stream A3 for stack reheat and instead use the air bleed 205 selectively for coal drying and/or start-up preheat applications as described herein.

The applicant has discovered the unexpected features of the configuration illustrated in FIG. 8, as compared to using conventional air preheater arrangements, are the reduction of air preheater air outlet temperature in combination with the extraction of heat from the flue gas FG to use for stack reheat, preheat and/or coal drying purposes, for example. In the embodiment of FIG. 8 this is accomplished by putting less flue gas heat into the air preheater 13 by diverting the second flue gas stream FG5 upstream of the air preheater 13 and extracting heat from it for use for stack reheat, preheat and/or coal drying purposes selectively if desired. In contrast, in the embodiments illustrated FIGS. 3, 4 and 7 this is accomplished by putting excess air into the air preheater 13 so that the first amount A1 produces both air for combustion and air P2 for stack reheat, preheat and/or coal drying purposes selectively if desired. In the hybrid embodiment illustrated in FIG. 9, a combination of both approaches is used, i.e. both flue gas diversion from (i.e. FG5) and excess air (i.e. A1) into the air preheater 13.

In the prior art, heat extracted from flue gas by air preheaters is reintroduced into the steam generating vessels by the combustion air flowing therethrough. With the exception of thermal conduction losses, all heat extracted from flue gas by the air preheater is reintroduced via the combustion air into the steam generating vessel. One feature of preferred embodiments of the invention is that none of the heat extracted from the flue gas stream FG, either in excess air 'produced' by the air preheater or by heat exchanger associated with is flue gas extracted/diverted upstream of the air preheater, is wasted during normal operation. While not used to preheat combustion air, all such extracted heat is reintroduced into what may be called the whole steam water cycle whether as stack reheat and/or for coal drying, for example.

While in the illustrated hybrid embodiment both second excess air portion P2 and diverted flue gas FG5 heated air stream A3 are used in whole or in part for reinjection as stack reheat, it will be understood that it is the combination of metering of the second flue gas stream FG5 and volume of the first amount A1 of preheater air which facilitate the downstream outlet temperatures required of the air preheater 13. This metering can suitably be selective to achieve the desired results as appropriate during start-up or at different operating loads, i.e. as related to the steam generating vessel 11 flue gas FG outlet temperatures.

Figure 9:
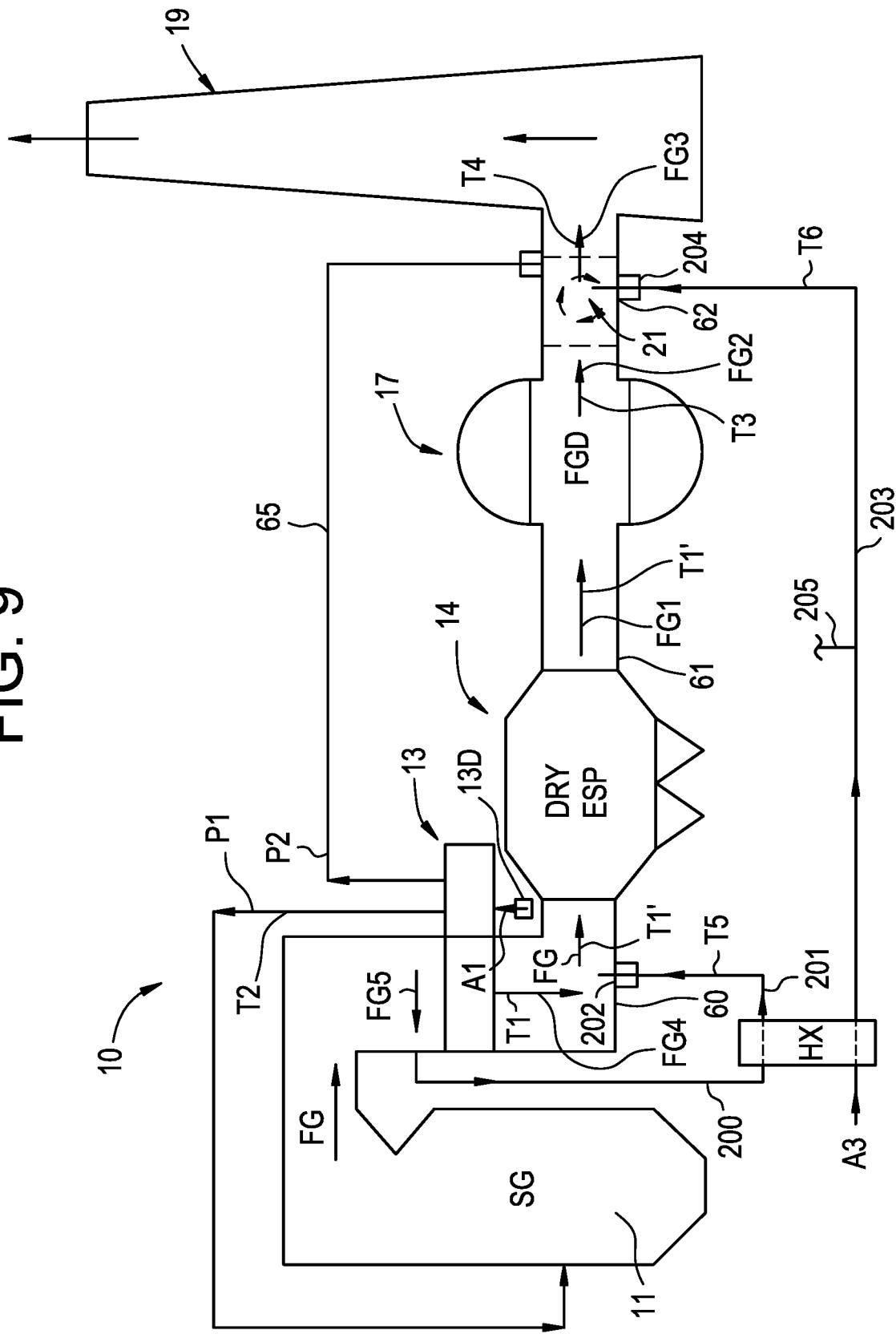
FIG. 9 is a schematic flow diagram of a hybrid embodiment of the steam generator combining reheat features of the embodiments illustrated in FIG. 3 and FIG. 8.

In alternatives to the embodiments of FIG. 8 and FIG. 9, some or all of the excess air portion P2 and/or some or all of the heated air stream A3 could, instead of being used for stack reheat be used for preheat, start-up preheat and/or coal drying applications. It may be for example particularly advantageous to use heated air stream A3 for coal drying applications. Similarly, it might be advantageous to avoid or minimize flow into the flue gas stream FG5 during start-up or low load conditions. Likewise, it might be advantageous to minimize the excess air portion P2 during start-up or low load conditions.

While in the embodiments illustrated in FIG. 8 and FIG. 9 the second flue gas stream FG5 is recombined with the first flue gas stream FG4 immediately downstream of the air preheater 13, it will be understood that in other embodiments such recombination can be effected further downstream. Alternatively, this second flue gas stream FG5 can be vented to atmosphere and/or treated separately from the first flue gas stream FG4.

When necessary particulate removal and/or other pollution control equipment can be used to condition appropriately the second flue gas stream FG5 independently of those used to condition the portion of flue gas FG passing through the air preheater 13. Advantageously, the heat exchanger HX does not permit gas leakage from the flue gas stream FG5 to the air stream A3. Consequently, no similar conditioning of the air stream A3 is required prior its use for stack reheat, equipment preheat and/or coal drying.

As previously described, the present invention includes a method for retrofitting a steam generator system 100, 100' of PCT Patent Application PCT/US2017/13459 for improved effectiveness. That method for retrofitting includes reconfiguring an air supply source 13D to the air preheater 13 to supply a first amount A1 of air in excess of that required for combustion of fuel in the steam generator vessel 11 and reconfiguring at least one of the air supply source 13D and the air preheater 13 the air preheater 13 such that the first amount A1 of air is provided at a mass flow sufficient to establish a first temperature T1 of a flue gas mixture FG exiting the air preheater 13, having the requisite character the invention requires. It will be appreciated that the present invention also includes a method for retrofitting a steam generator system such as 100, 100' of PCT Patent Application PCT/US2017/13459 with the apparatus of the embodiments illustrated in FIG. 8 and FIG. 9 associated with the second flue gas stream FG5.

The inventors have surprisingly discovered through years of experimentation, analysis and testing a combination of optimum temperature ranges and system configurations for operation of the steam generator system 10 of the present invention that improves the thermal efficiency of the steam generator system compared to prior art steam generator systems such as 100 and 100' while reducing the potential for fouling and visible stack plume.

For example, those skilled in the art have tried and have been unsuccessful in being able to increase air flow through the preheater 13 to achieve a magnitude in excess of that required for combustion of fuel in the steam generator vessel 11 and while being sufficient to establish the first temperature T1 of the flue gas mixture FG exiting the air preheater 13 having a temperature of 105° C. (220° F.) or less, while in the same system employing all of the following specific design features: 1) mitigating $SO_3$ in the flue gas mixture generated in the steam generator vessel 11, the mitigating of $SO_3$ occurring before the flue gas mixture FG enters the air preheater 13; 2) configuring the air preheater 13 to heat the first amount of air A1 to a second temperature T2 of 288° C. to 399° C. (550° F. to 750° F.); 3) supplying a first portion P1 of the first amount A1 of air to the steam generator vessel 11 for combustion of the fuel; 4) discharging the flue gas mixture FG at the first temperature T1, directly from the air preheater 13 to the particulate collection system 14 thereby removing particulate from the flue gas mixture FG and creating a first treated flue gas mixture FG1; 5) discharging the first treated flue gas mixture FG1 from the particulate removal system 14 directly into the flue gas desulfurization system 17 thereby creating in and discharging from the flue gas desulfurization system 17, a second treated flue gas mixture FG2 at a third temperature T3 of 52° C. to 60° C. (125° F. to 140° F.); 6) injecting a second portion P2 of the first amount A1 of air at the second temperature T2 with the second flue treated flue gas mixture FG2 at the third temperature T3 thereby creating third treated flue gas mixture FG3 at a fourth temperature T4 of 79° C. to 88° C. (175° F. to 190° F.), prior to entering the discharge stack 19; and 7) admitting the third treated flue gas mixture FG3 to the discharge stack 19 at the fourth temperature T4. One skilled in the relevant art would understand that there are an almost infinite number of system configurations that could be tried by varying the temperature of the flue gas exiting the air preheater 13 along with the seven other design features delineated above. It is only as a result of the analysis, experimentation and testing that the inventors have overcome problems with competing design features and discovering the optimum combination as disclosed and claimed herein.

In general, the testing, experimentation and analysis included consideration of: 1) mixing efficiency of the injection of the second portion P2 of the first amount A1 of air at the second temperature T2 with the second flue treated flue gas mixture FG2; 2) fly ash concentrations at various locations in the steam generator system including the amount on the second portion P2 of air; 3) determination of the amount of the second portion P2 of air which would provide enough heat to justify removal of the GGH heat exchangers; 4) pressure drops though the steam generator system 10; 5) heat loss in the excess air duct 65; 6) the effect on fuel combustion in the steam generator vessel; 7) the effect on thermal efficiency of the steam generator system; and 8) efficiency and water supply requirements for the FGD 17.

Those skilled in the art have been discouraged from reducing the temperature of the flue gas exiting the air preheater to 105° C. (220° F.) or less because of several problems encountered. A first problem is that this level of flue gas temperature reduction (i.e., reducing the temperature of the flue gas exiting the air preheater to 105° C. (220° F.) or less) cannot normally be economically achieved without incremental air flow. There is a practical limit to the amount of heat that can be recovered from flue gas passing through a normal air preheater. This limit is established based on the maximum possible heat transfer, q max=(m*c)min*(Tgi-Tai), wherein Tgi is the temperature of the flue gas entering the air preheater and Tai is the temperature of the air entering the air preheater. The quantity (m*c)min is the product of the mass flow rate and specific heat of the minimum fluid, and for a normal air preheater the minimum fluid is the combustion air. As the mass flow of the air is increased, there is a direct increase in the maximum possible heat transfer. The present invention makes use of incremental air flow as part of the means for incrementally reducing flue gas temperature. In maintaining and improving steam generator efficiency however, it is also necessary to maintain or improve the amount of heat returned to the steam generator. This is accomplished by maintaining or improving the effectiveness of the air preheater, Effectiveness=Actual Heat Transfer/Maximum Possible Heat Transfer. It is the actual heat transfer to the combustion air that must be maintained or improved, and this is accomplished by a) eliminating the use of cold air steam air preheat; or b) the use or more, and/or more highly effective heat transfer surface.

A second problem is that there has been no significant demand for incremental, preheated air flow at the plants. The present invention delivers a source of preheated air that can be used for stack gas reheat.

A third problem is that for many fuels, a reduction in flue gas temperature leads to significant air preheater fouling and/or corrosion. As needed based on the $SO_3$ content of the flue gas, the present invention makes use of $SO_3$ mitigation to reduce the $SO_3$ content to less than or equal to approximately 5 ppmv entering the air preheater. This has been demonstrated to prevent fouling and corrosion at reduced flue gas temperatures well below the dew point of the original flue gas.

A fourth problem is that plants without the means for adequate control of the minimum cold end element temperature have experienced severe corrosion due to the condensation of halogen acids at temperatures near the water dew point. In one embodiment, the present invention employs a flue gas humidity sensor to establish the water content of the flue gas, which may be used to calculate the water dew point. The dew points of the critical halogen acids (HCl, HF, HBr) may then be estimated using dew point correlations available in literature. The use of an infrared or other sensor may be used to determine the minimum cold end element temperature, which may be compared to the critical dew points. The avoidance of dew point condensation is achieved by a) the use of steam coils to preheat the cold incoming air or 2) the reduction in the amount of preheated air used for stack gas reheat.

In another embodiment of the invention (not shown) the second portion P2 of the first amount A1 of air is not used, or is only in part used, as flue gas reheat air but instead is used exclusively, or predominantly, as preheat air fed to a coal dryer during operation and selectively to the associated steam generator vessel 11 and/or upstream of the particulate removal system 14 during start-up. Using excess air for coal drying effectively reduces the moisture in coal fed to the steam generator vessel 13 thereby reducing thermal losses that can be expected consequent to excess steam in what becomes the flue gas. It will be understood that this moisture reduction may also reduce the incidence of condensation in downstream equipment at start-up. In modern coal fired boilers, during start-up it is necessary to fire the steam generator vessel 11 with oil or natural gas as start-up fuel fed through combustion lances until such time as the steam generator vessel 11 is sufficiently heated to sustain vortex flames formed by combusting ground coal fed from coal burners. It is believed that too rapid a start-up may lead to unnecessary thermal shocks on pipe welds and consequential damage within the steam generator vessel, for example. Too slow a start-up will result in unnecessary use of oil and gas and unwanted delay in bringing the steam generating system up to full operational load. Any way in which the start-up time can be reduced without increasing thermal shocks should lead to operational and cost advantages beneficial to a plant operator. Utilizing the preheat air of this embodiment in addition to the normal preheated combustion air should during start-up effectively puts more preheat back into the steam generating vessel 11 at moderately low temperatures as compared to those of oil or gas flames. This may permit quicker start-up without the additional thermal shocking of burning start-up fuel more voluminously to supply equivalent additional preheat. It will be appreciated that in this another embodiment the operation on the steam generator system is not dependent on the presence of an FGD or in elevating flue gas temperatures and/or operating a dry stack as is variously required in other described embodiments.

Figure 10:
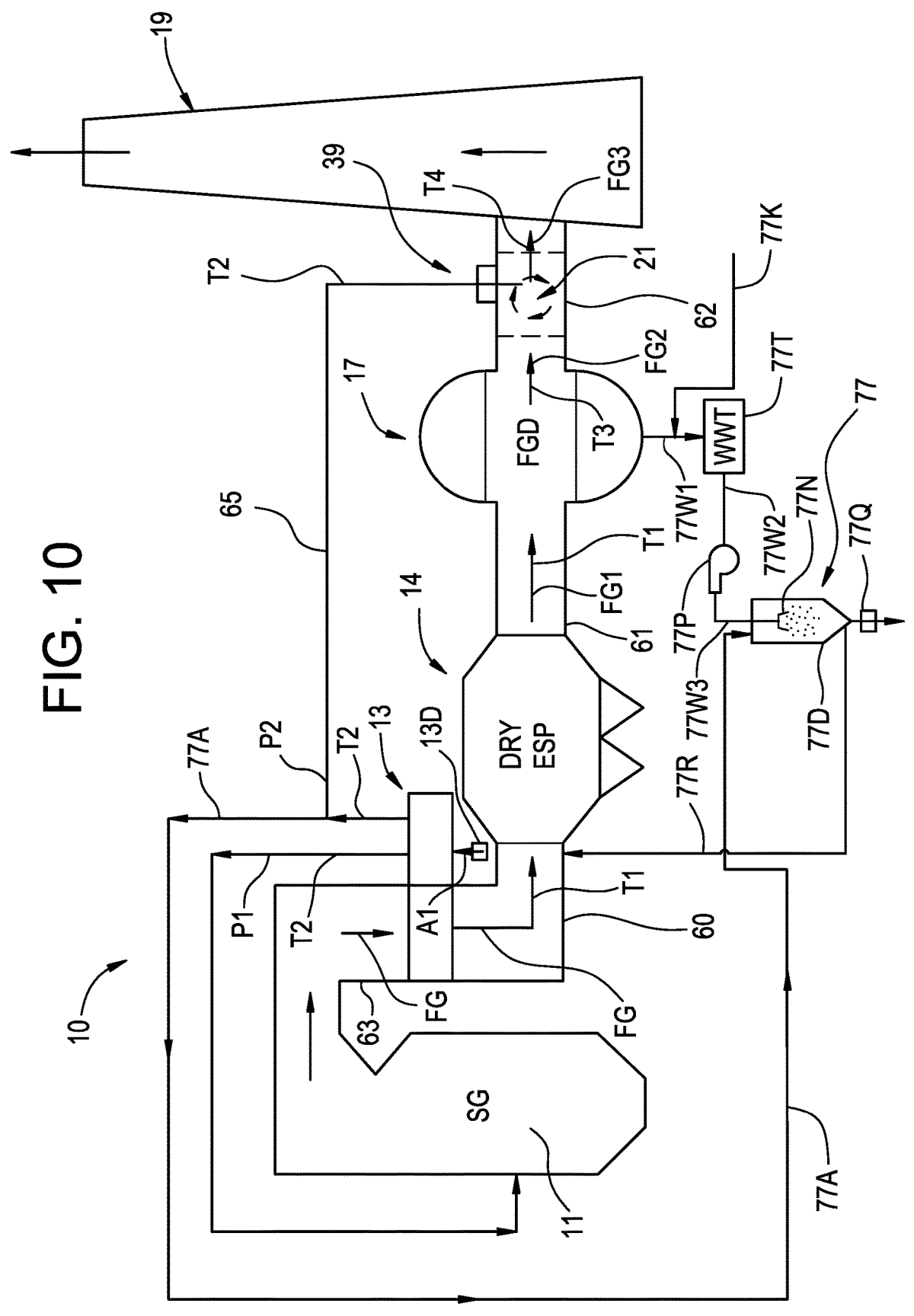

As shown in FIG. 10, the first amount of heat is utilized in a waste water drying system 77 that is in communication with the steam generator system 10. The waste water drying system 77 includes a waste water storage tank 77T that is in fluid communication with the flue gas desulfurization system 17 via a conduit 77W1 or via conduit 77K that supplies waste water from other waste water systems in the steam generator system. The waste water drying system 77 includes a spray drying vessel 77D that is downstream of the waste water storage tank 77T and in fluid communication therewith via conduits 77W2 and 77W3. A pump 77P is provided between the conduits 77W2 and 77W3 to transport the waste water into the spray drying vessel 77D. The waste water drying vessel 77D has a water inlet that is configured with a spray nozzle 77N. The spray dryer vessel 77D is in fluid communication with the air preheater 13 via a conduit 77A which conveys heated air to the waste water drying vessel 77D. The heated air mixes with and evaporates waste water sprayed into the waste water drying vessel 77D and thereby creating a dry particulate waste that is conveyed out of the waste water drying vessel 77D via a discharge conduit 77R. The discharge conduit 77R conveys the dry particulate waste into the duct 60 upstream of the particulate removal system 14 for collection therein. The waste water drying vessel 77D also has a particulate discharge port 77Q located at a bottom conical portion thereof, for optional discharge of the dry particulate waste or for cleaning of the internals of the waste water drying vessel 77D. The waste water drying system 77 has utility in reducing or eliminating the amount of liquid effluents from the flue gas desulfurization system 17, while not adversely affecting the heat rate of the steam generator system 10.

Figure 11:
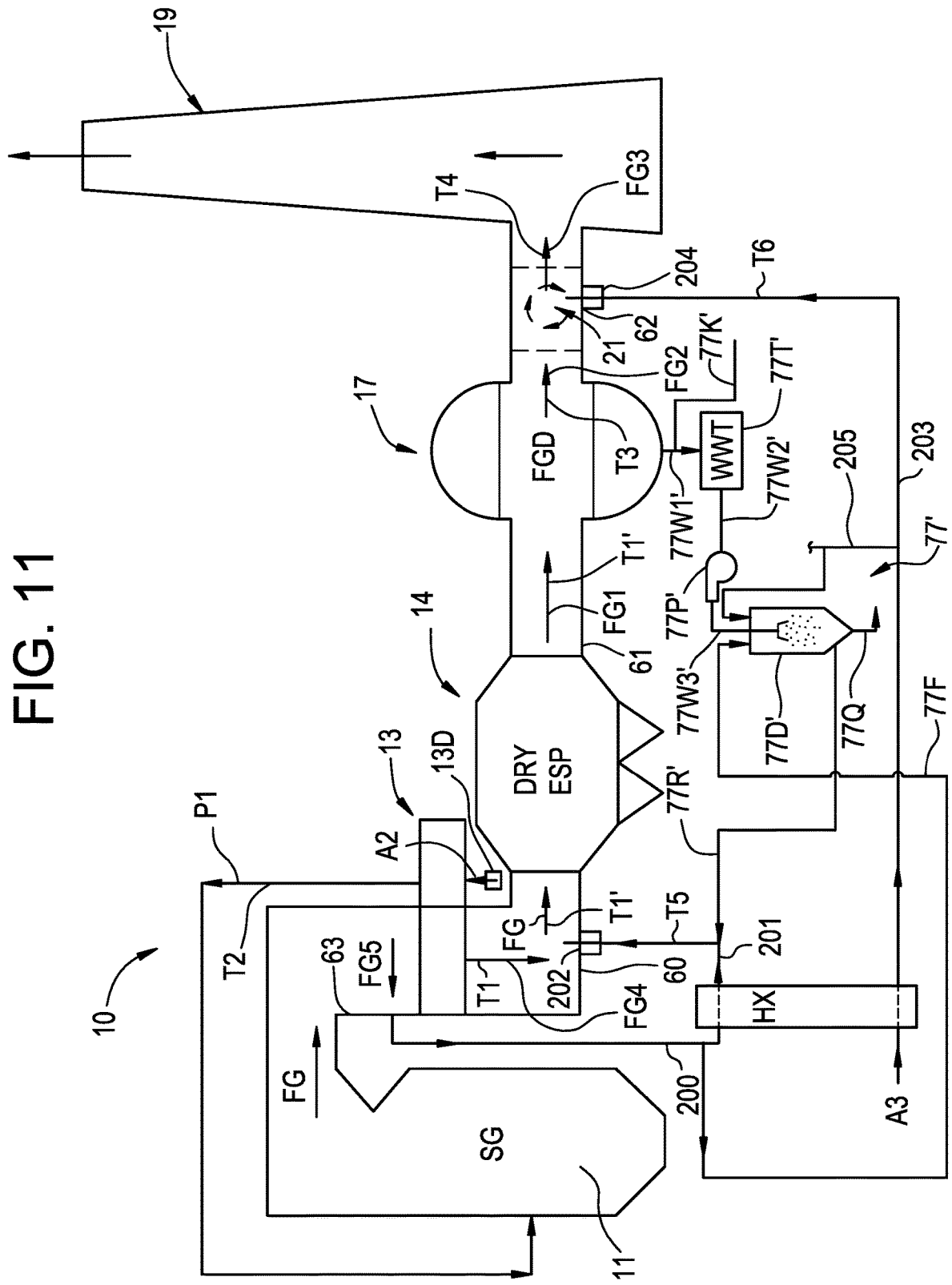
FIG. 11 is a schematic flow diagram of a yet further embodiment of the steam generator of the present invention including another waste water drying loop.

As shown in FIG. 11, the first amount of heat is utilized in a waste water drying system 77' that is in communication with the steam generator system 10. The waste water drying system 77' includes a waste water storage tank 77T' that is in fluid communication with the flue gas desulfurization system 17' via a conduit 77W1' or via conduit 77K' that supplies waste water from other waste water systems in the steam generator system. The waste water drying system 77' includes a spray drying vessel 77D' that is downstream of the waste water storage tank 77T' and in fluid communication therewith via conduits 77W2' and 77W3'. A pump 77P' is provided between the conduits 77W2' and 77W3' to transport the waste water into the spray drying vessel 77D'. The waste water drying vessel 77D' has a water inlet that is configured with a spray nozzle 77D'. The spray dryer vessel 77D' is in fluid communication with the air preheater 13 via a conduit 77F' which conveys flue gas FG5 to the waste water drying vessel 77D'. The flue gas FG5 mixes with and evaporates waste water sprayed into the waste water drying vessel 77D' and thereby creating a dry particulate waste that is conveyed out of the waste water drying vessel 77D' via a discharge conduit 77R'. The discharge conduit 77R' conveys the dry particulate waste into the duct 60 upstream of the particulate removal system 14 for collection therein. The waste water drying vessel 77D' also has a particulate discharge port 77Q' located at a bottom conical portion thereof, for optional discharge of the dry particulate waste or for cleaning of the internals of the waste water drying vessel 77D'. In one embodiment, the flue gas FG5 flows through the heat exchanger HX via the duct 200 and back into the duct 60 via duct 201. The air stream A3 flows through the heat exchanger HX and heated air is discharged therefrom in the duct 203. The heated air is optional supplied to the waste water dryer vessel 77D' via the bleed duct 205. The waste water drying system 77' has utility in reducing or eliminating the amount of liquid effluents from the flue gas desulfurization system 17, while not adversely affecting the heat rate of the steam generator system 10.

Figure 12:
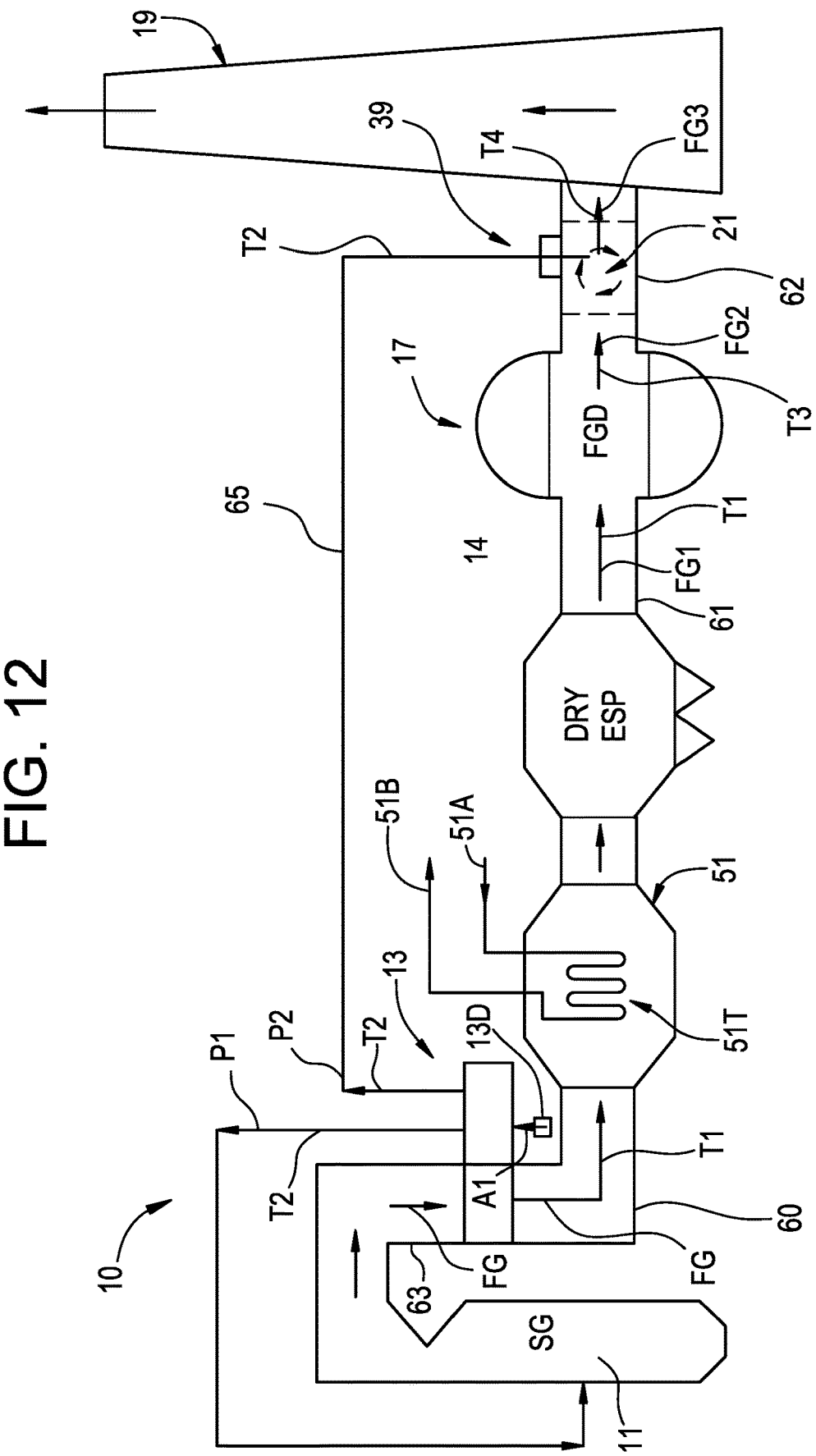
FIG. 12 is a schematic flow diagram of a yet further embodiment of the steam generator of the present invention including a feed water heating loop.

As shown in FIG. 12, the first amount of heat is utilized to improve the heat rate of the steam generator system 10, for example, by preheating feed water that is supplied to the steam generator vessel 11. A heat exchanger 51 (e.g., a low temperature economizer or low pressure economizer) is located between and in fluid communication with the air preheater 13 and the particulate removal system 14. The heat exchanger 51 has a tube bundle 51T disposed therein. The flue gas FG flows around the outside of the tube bundle 51T. The tube bundle 51T has an inlet 51A for receiving feed water or condensate to be heated; and an outlet 51B for discharging feed water therefrom. The heated feed water is conveyed other feed water heaters prior to being discharged into water wall tubes (not shown) of the steam generator vessel 11.

Figure 13:
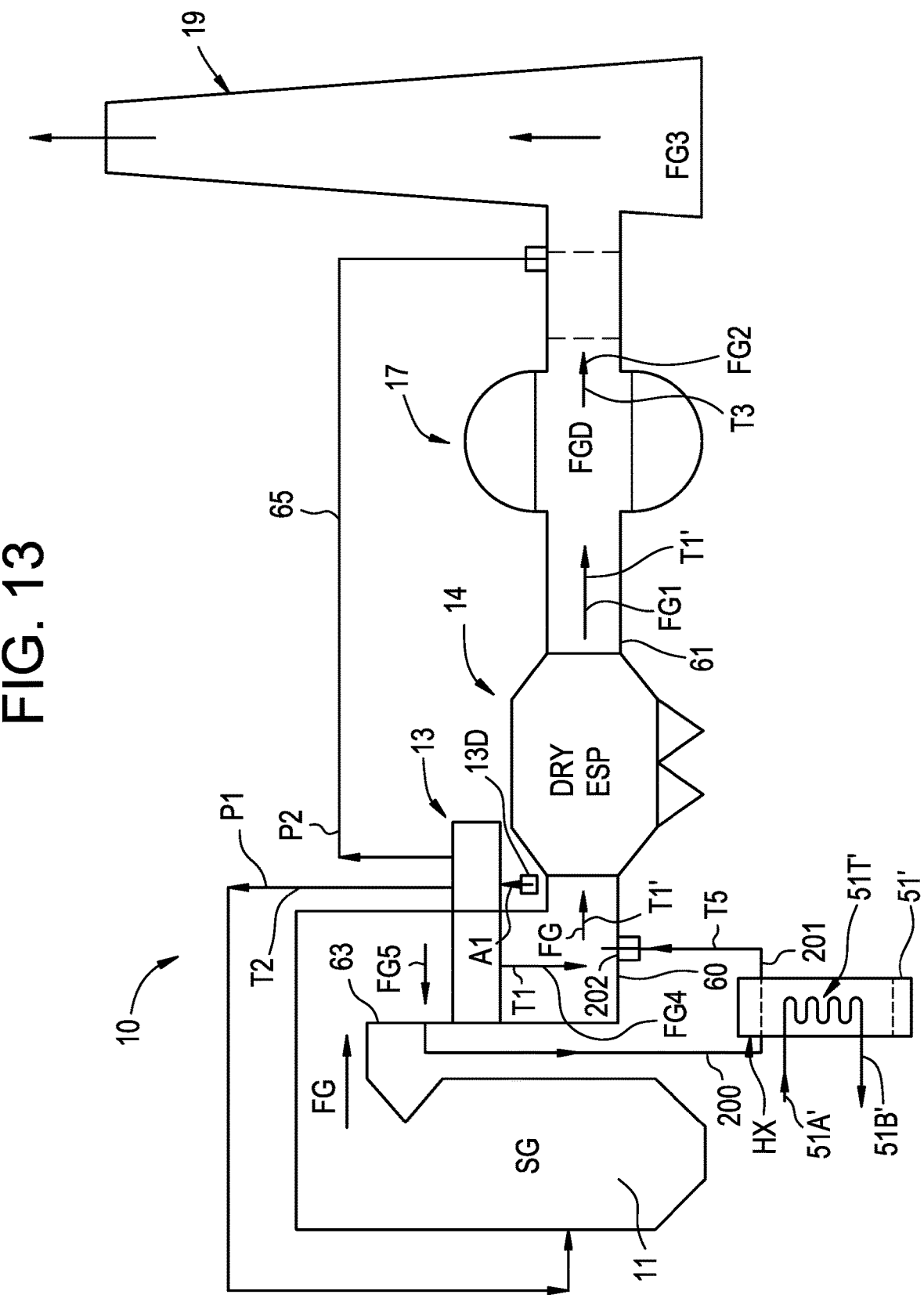
FIG. 13 is a schematic flow diagram of a yet further embodiment of the steam generator of the present invention including another feed water heating loop.

As shown in FIG. 13, the first amount of heat is utilized to improve the heat rate of the steam generator system 10, for example, by preheating feed water that is supplied to the steam generator vessel 11. A heat exchanger 51' is in fluid communication with the duct 63 which conveys the flue gas FG5 to the heat exchanger 51'. The heat exchanger 51' is in fluid communication with the duct 60 via the duct 201. The heat exchanger 51' has a tube bundle 51T' disposed therein. The flue gas FG5 flows around the outside of the tube bundle 51T'. The tube bundle 51T' has an inlet 51A' for receiving feed water or condensate to be heated; and an outlet 51B' for discharging feed water therefrom. The heated feed water is conveyed other feed water heaters prior to being discharged into water wall tubes (not shown) of the steam generator vessel 11.

While FIGS. 12 and 13 illustrate the first amount of heat is utilized to improve the heat rate of the steam generator system 10, for example, by preheating feed water that is supplied to the steam generator vessel 11, the present invention is not limited in this regard as the first amount of heat may be utilized for other means including but not limited to condensate heating, mitigating parasitic loads (e.g., space and potable water heating and steam for turbines for driving rotating equipment such as fans in lieu of electric driven motors, and other steam or heat loads other than for steam used for generating electricity) and steam cycle efficiency improvements.

Figure 14:
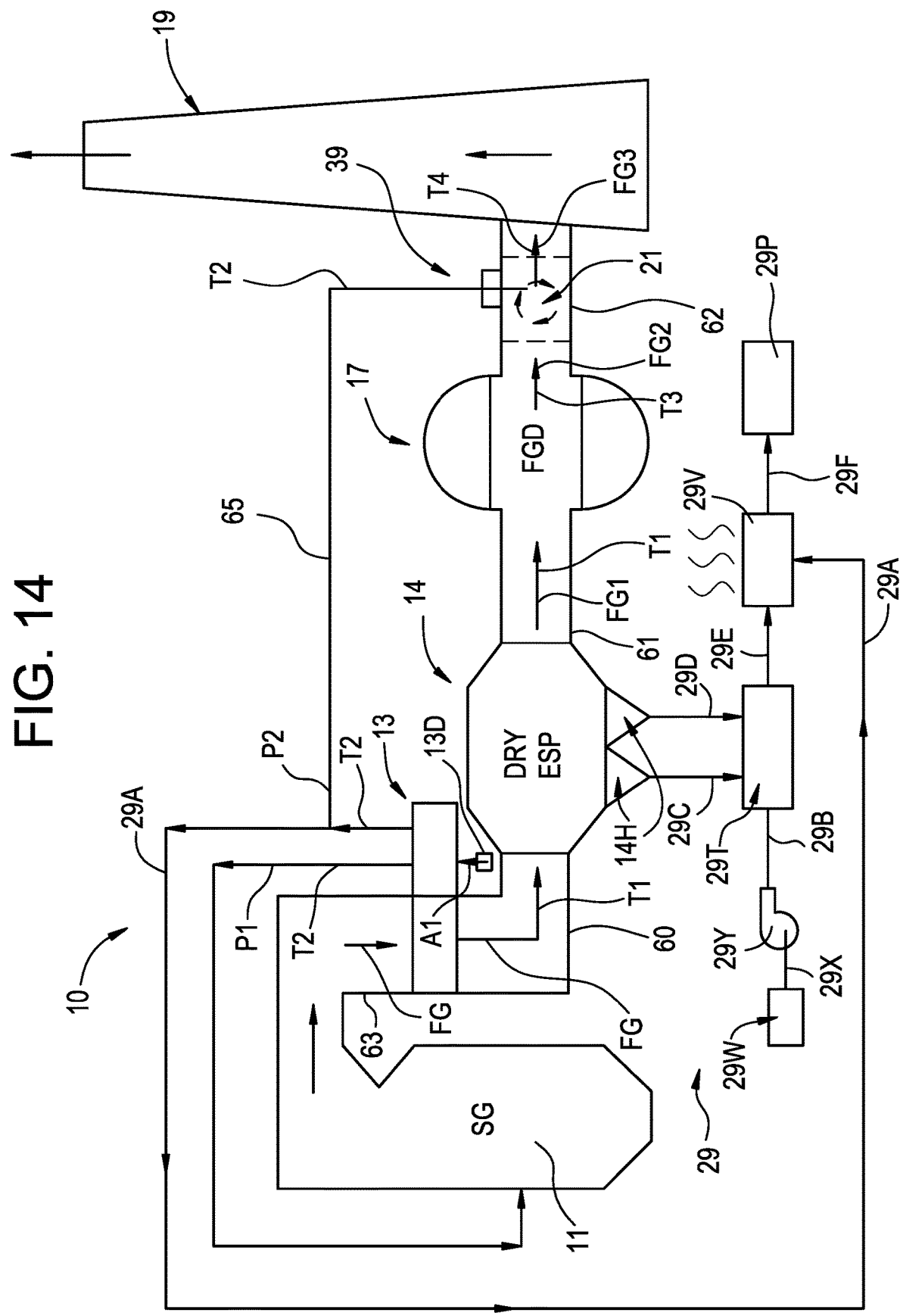
FIG. 14 is a schematic flow diagram of a yet further embodiment of the steam generator of the present invention including a wet ash system drying loop.

As shown in FIG. 14, the first amount of heat is utilized to evaporate water from a slurry of ash discharged from a wet ash removal system 29. The wet ash removal system 29 includes a collection tank 29T that is in fluid communication with the fly ash hoppers 14H of the particulate removal system 14 via conduits 29C and 29D. A water supply 29W is in fluid communication with the collection tank 29T via conduits 29X and 29B and a pump 29Y located therebetween. An evaporator vessel 29V (e.g., a direct or shell and tube heat exchanger) is located downstream of the collection tank 29D and is in fluid communication therewith via a conduit 29E. The evaporator vessel 29V is in fluid communication with an ash pond 29P via a conduit 29F. All or a portion of the first amount of heat is supplied to the evaporator vessel 29V via a conduit 29A. The conduit 29A taps off of a downstream side of the air side of the air preheater 13. Heated air from the air preheater 13 evaporates all or a portion of the water contained in the ash slurry that resides in the evaporator vessel 29V to reduce the amount of water transported to the ash pond 29P.

Figure 15:
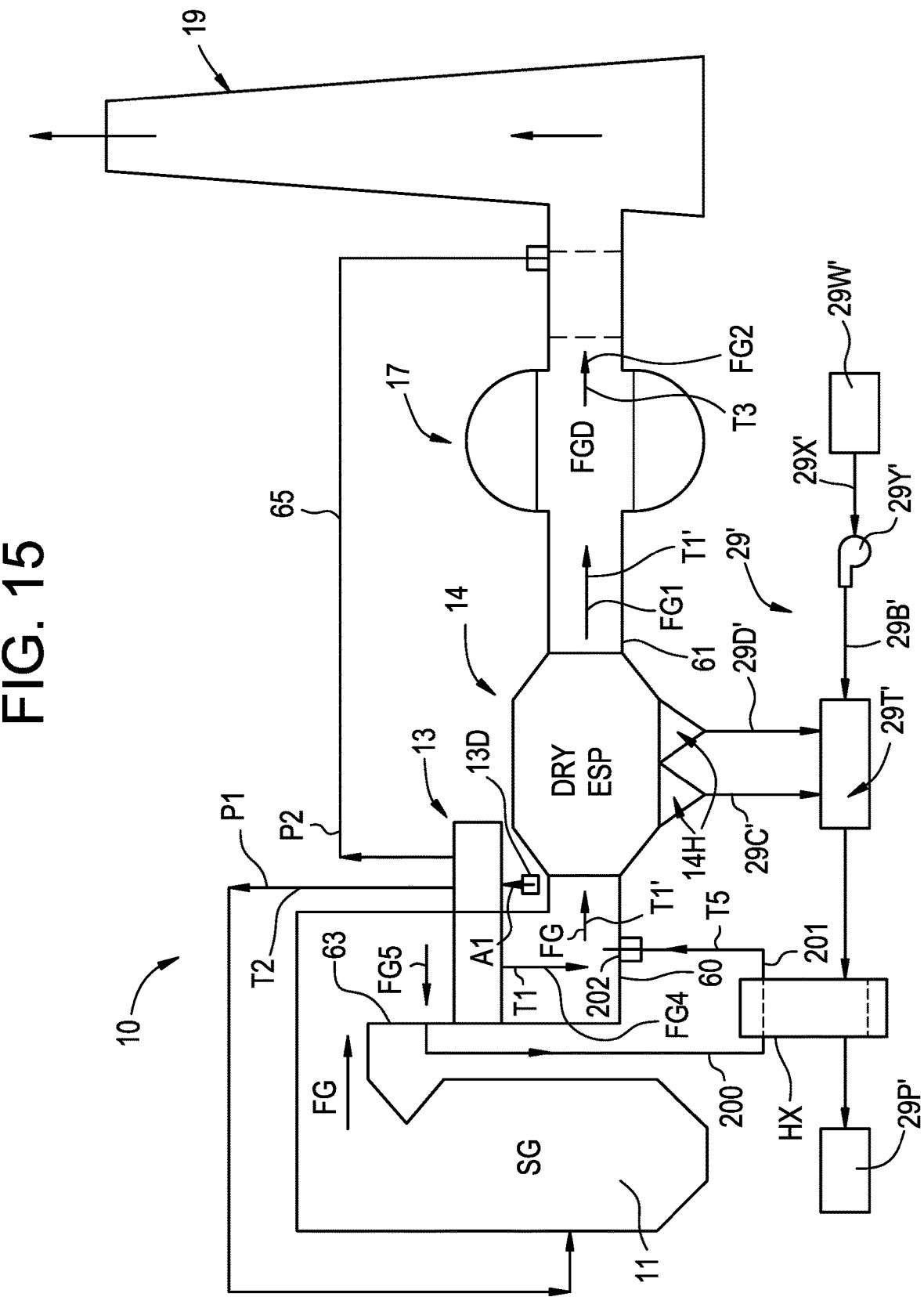
FIG. 15 is a schematic flow diagram of a yet further embodiment of the steam generator of the present invention including another wet ash system drying loop.

As shown in FIG. 15, the first amount of heat is utilized to evaporate water from a slurry of ash discharged from a wet ash removal system 29'. The wet ash removal system 29' includes a collection tank 29T' that is in fluid communication with the fly ash hoppers 14H' of the particulate removal system 14' via conduits 29C' and 29D'. A water supply 29W' is in fluid communication with the collection tank 29T' via conduits 29X' and 29B' and a pump 29Y' located therebetween. An evaporator vessel HX (e.g., a direct or shell and tube heat exchanger) is located downstream of the collection tank 29D' and is in fluid communication therewith via a conduit 29E'. The evaporator vessel HX is in fluid communication with an ash pond 29P' via a conduit 29F'. All or a portion of the first amount of heat is supplied to the evaporator vessel HX via the flue gas FG5 that is conveyed to the evaporator vessel 29D' via the duct 200. The duct 200 taps off of the duct 63 upstream of the flue gas side of the air preheater 13. The flue gas FG5 from the air preheater 13 evaporates all or a portion of the water contained in the ash slurry that resides in the evaporator vessel HX to reduce the amount of water transported to the ash pond 29P'. The flue gas FG5 is returned to the downstream side of the flue gas side of the air preheater 13 into the duct 60 via the duct 201. It will be appreciated that ash slurry derived direct from the steam generator 11 may be treated similarly as aforementioned for that derived from the wet ash removal system 29.

Although the present invention has been disclosed and described with reference to certain embodiments thereof, it should be noted that other variations and modifications may be made, and it is intended that the following claims cover the variations and modifications within the true scope of the invention.

What is claimed is:

1. A method for operating a steam generator system, the method comprising:
   providing a steam generator system comprising a steam generator vessel, an air supply system, air regulator means and an air preheater with heat transfer elements therein, with the air supply system being in communication with the steam generator vessel through the air preheater, and with the steam generator vessel being in communication with the air preheater;
   providing a control unit comprising a computer processor, memory and signal processing electronics;
   providing, by the air supply system and via the air regulator means, a first amount of air to the air preheater, the magnitude of the first amount of air being dependent on performance of the heat transfer elements;
   providing, by the air preheater, at least a portion of the first amount of air to the steam generator vessel as combustion air;
   discharging from the steam generator vessel a flue gas mixture;
   flowing at least a portion of the flue gas mixture into the air preheater;
   mitigating $SO_3$ in the flue gas mixture before the flue gas mixture enters the air preheater;
   the heat transfer elements having a heat transfer capacity in excess of that required to preheat the combustion air, the air preheater having a cold end metal which is at a lowest temperature in the air preheater;
   transferring a first amount of heat away from at least one of the steam generator vessel, the air preheater, and the flue gas mixture sufficient to establish a first temperature of the flue gas mixture exiting the air preheater of a magnitude such that the cold end metal of the air preheater has a cold end metal temperature that is greater than or equal to a water dew point temperature in the air preheater and such that the cold end metal temperature is less than a sulfuric acid dew point temperature at the cold end metal, the sulfuric acid dew point temperature being a temperature at which sulfuric acid condenses on the heat transfer elements;
   providing an infrared sensor in proximity to the cold end metal;
   determining, with the infrared sensor, the cold end metal temperature;
   comparing the cold end metal temperature to the water dew point temperature; and
   controlling, with the control unit, the cold end metal temperature to be no less than the water dew point temperature.

2. The method of claim 1, further comprising:
   providing a particulate removal system and a flue gas desulfurization system, with the particulate removal system being located downstream of the air preheater, and with the flue gas desulfurization system being located downstream of the particulate removal system;
   discharging at least a portion of the flue gas mixture exiting the steam generator vessel directly from the air preheater to the particulate removal system thereby removing particulates from the flue gas mixture and creating a first treated flue gas mixture; and
   discharging the first treated flue gas mixture from the particulate removal system directly into the flue gas desulfurization system thereby creating in and discharging from the flue gas desulfurization system, a second treated flue gas mixture.

3. The method of claim 1, wherein the first amount of heat is of a magnitude of 10 to 25 percent of that used to preheat the combustion air.

4. The method of claim 1, wherein the first amount of air is of a magnitude in excess of that required as combustion air.

5. The method of claim 1, further comprising:
   providing a flue gas discharge stack, with the steam generator vessel being in communication with the discharge stack through at least one of the air preheater, a particulate removal system and a flue gas desulfurization system; and
   utilizing at least a portion of the first amount of heat to increase a second temperature of the flue gas mixture, upstream of an outlet of the discharge stack, to a magnitude sufficient to mitigate visible plume exiting the discharge stack or to mitigate corrosion in the discharge stack.

6. The method of claim 1, further comprising at least one of:
   utilizing at least a portion of the first amount of heat during boiler start up to selectively preheat at least one of a particulate removal system, a flue gas desulfurization system, and ducting between the particle removal system and the flue gas desulfurization system;
   utilizing at least a portion of the first amount of heat during boiler operation for a coal drying facility;
   releasing at least a portion of the first amount of heat to atmosphere;
   utilizing at least a portion of the first amount of heat to preheat feed water or condensate supplied to the steam generator system;
   utilizing at least a portion of the first amount of heat to evaporate water from an ash slurry discharged from a wet ash removal system in communication with at least one of the particulate removal system and the steam generator vessel; and
   utilizing at least a portion of the first amount of heat in a waste water system to reduce water discharge therefrom.

7. The method of claim 6, further comprising:
supplying at least one of a portion of the flue gas mixture and a portion of the first amount of air to the waste water system to evaporate waste water therein;
creating particulate waste in the waste water system; and
transporting the particulate waste to the particulate removal system.

8. The method of claim 1, wherein the mitigating the $SO_3$ in the flue gas mixture comprises at least one of:
chemical rendering; and
supplying low sulfur fuel to the steam generator system.

9. The method of claim 1, further comprising configuring the air preheater to heat the first amount of air to 288° C. to 399° C. (550° F. to 750° F.).

10. The method of claim 1, wherein the air supply system provides the first amount of air to the air preheater at a mass flow sufficient to establish the first temperature from 105° C. to 125° C. (220° F. to 257° F.) of the flue gas mixture exiting the air preheater, the first temperature being such that the air preheater has a cold end outlet temperature defined by the air preheater operating with increased heat recovery (HR) of at least 1% as calculated according to the equation:

$$HR = 100\% \times ((Tgi - TgoAdvX)/(Tgi - TgoSTD) - 1)$$

wherein:

$Tgi$ = inlet temperature of the flue gas mixture entering the air preheater;

$TgoAdvX$ = the first temperature of the flue gas mixture exiting the air preheater; and $TgoSTD$ = outlet temperature of another flue gas mixture exiting another air preheater, wherein a second amount of air is provided to the other air preheater, the second amount of air is of a magnitude equal to that required for combustion, and a rotor diameter and depth of the other preheater is equivalent to a rotor diameter and depth of the air preheater.

11. The method of claim 1, wherein the steam generator system is a retrofit steam generator system.

12. The method of claim 11, wherein the discharging of the flue gas mixture comprises discharging the flue gas mixture from a particulate removal system directly into a flue gas desulfurization system using at least one heat exchanger disposed between the particulate removal system and the flue gas desulfurization system.

13. A steam generator system configured to operate according to the method of claim 1.

14. The method for operating a steam generator system of claim 1, further comprising:
providing seals in the air preheater, the seals being configured to mitigate air leakage within the air preheater;
wherein the first amount of air is dependent on performance of the seals.

* * * * *